(12) United States Patent
Nakano et al.

(10) Patent No.: US 7,404,076 B2
(45) Date of Patent: Jul. 22, 2008

(54) ENCRYPTED DATA DELIVERY SYSTEM

(75) Inventors: Toshihisa Nakano, Neyagawa (JP); Motoji Omori, Hirakata (JP); Makoto Tatebayashi, Takaraduka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 780 days.

(21) Appl. No.: 10/471,803

(22) PCT Filed: Jun. 13, 2002

(86) PCT No.: PCT/JP02/05874

§ 371 (c)(1),
(2), (4) Date: Sep. 16, 2003

(87) PCT Pub. No.: WO03/015344

PCT Pub. Date: Feb. 20, 2003

(65) Prior Publication Data

US 2004/0098579 A1      May 20, 2004

(30) Foreign Application Priority Data

Aug. 1, 2001   (JP) ............................. 2001-233223

(51) Int. Cl.
*H04L 9/00* (2006.01)
(52) U.S. Cl. ...................... 713/150; 713/152
(58) Field of Classification Search ................. 713/189, 713/150, 152
See application file for complete search history.

(56) References Cited

U.S. PATENT DOCUMENTS

| | | | |
|---|---|---|---|
| 5,841,865 A | 11/1998 | Sudia | |
| 5,949,877 A | 9/1999 | Traw et al. | |
| 6,389,403 B1 * | 5/2002 | Dorak, Jr. | ................... 705/52 |
| 6,449,719 B1 * | 9/2002 | Baker | ........................ 713/168 |

(Continued)

FOREIGN PATENT DOCUMENTS

EP    0 930 556    7/1999

(Continued)

OTHER PUBLICATIONS

Hungarian Search Report mailed Sep. 29, 2004 for Hungarian Application No. P0401787 with partial English translation.

(Continued)

*Primary Examiner*—Nasser Moazzami
*Assistant Examiner*—Mohammad W Reza
(74) *Attorney, Agent, or Firm*—Wenderoth, Lind & Ponack, L.L.P.

(57) ABSTRACT

A system structured from a management device, a content key distribution device and a plurality of terminals suppresses the data volume of a terminal revocation list (TRL). The management device generates and transmits a TRL formed from data that expresses terminal IDs of all terminals to be invalidated, by only a value and a position of a common bit string in the IDs, to the content key distribution device. Each terminal holds a terminal ID that includes a manufacturer, ID and a serial number, and requests the distribution of a content key by sending the terminal ID to the content key distribution device. The content key distribution device refers to the TRL, judges whether the terminal ID transmitted from the terminal is that of an invalidated terminal, and if negative, encrypts and transmits the content key to the terminal.

2 Claims, 20 Drawing Sheets

U.S. PATENT DOCUMENTS

| | | | | |
|---|---|---|---|---|
| 6,963,882 | B1 * | 11/2005 | Elko et al. | 707/200 |
| 2001/0056541 | A1 * | 12/2001 | Matsuzaki et al. | 713/193 |
| 2002/0197979 | A1 * | 12/2002 | Vanderveen | 455/410 |

FOREIGN PATENT DOCUMENTS

| | | |
|---|---|---|
| HU | 201437 | 10/1990 |
| HU | 216 231 | 5/1997 |
| JP | 10-322676 | 12/1998 |
| JP | 11-205305 | 7/1999 |

OTHER PUBLICATIONS

Warwick Ford, Michael Baum, Secure Electronic Commerce, 1997, Prentice Hall, Section 6.6, pp. 230-239.

"5C Digital Transmission Content Protection White Paper", Revision 1.0, Jul. 14, 1998, p. 12.

* cited by examiner

FIG.4

ENCRYPTION KEY STORAGE UNIT 124

| TERMINAL ID | ENCRYPTION KEY |
|---|---|
| 0000 | $EK_0$ |
| 0001 | $EK_1$ |
| 0010 | $EK_2$ |
| ⋮ | ⋮ |
| 1111 | $EK_{15}$ |

FIG.8

| TRL | FIELD | | | EXEMPLARY BIT SIZE (FURTHER EG.) |
|---|---|---|---|---|
| 210 | VERSION INFORMATION | | | 8 (8) |
| 221 | GROUP INFORMATION | ENTRY NO. (M) | | 4 (128) ← 222 |
| 220 | | M × { ID / MASK DATA | ID | 4 (128) ← 223 |
| | | | MASK DATA | 4 (128) ← 224 |
| 225 | DISCRETE INFORMATION | ENTRY NO. (N) | | 4 (128) ← 226 |
| | | N × ID | | 4 (128) ← 227 |
| 230 | SIGNATURE INFORMATION | | | 64 (320) |

ID-RELATED INFORMATION (221, 225)

FIG.9

EXEMPLARY TRL CONTENT

| FIELD | | | EXEMPLARY CONTENT |
|---|---|---|---|
| VERSION INFORMATION | | | 1 |
| ID-RELATED INFORMATION | GROUP INFORMATION | ENTRY NO. | 2 |
| | | ID | '1100'b |
| | | MASK DATA | '1100'b |
| | | ID | '0110'b |
| | | MASK DATA | '1110'b |
| | DISCRETE INFORMATION | ENTRY NO. | 1 |
| | | ID | '0001'b |
| SIGNATURE INFORMATION | | | (VALUE REFLECTING CONTENT OF ALL FIELDS) |

FIG.12

TERMINAL ID (128-BIT)

| FIELD | BIT SIZE | BIT POSITION |
|---|---|---|
| 301 — MANUFACTURER ID | 32 | 0~31 |
| 302 — PRODUCT ID | 32 | 32~63 |
| 303 — PRODUCT VERSION ID | 32 | 64~95 |
| 304 — SERIAL NO. | 32 | 96~127 |

FIG.13

TRL

| FIELD | | BIT SIZE | |
|---|---|---|---|
| 310 VERSION | | 8 | |
| 320 ISSUER INFORMATION | | 128 | |
| 330 INVALIDATED TERMINAL NO. | | 128 | |
| 340 ID-RELATED INFORMATION | ENTRY NO. (N) | 32 | ← 341 |
| | N × { ID | 128 | ← 342 |
| | MASK BIT | 8 | ← 343 |
| 350 SIGNATURE INFORMATION | | 320 | |

FIG.15

EXEMPLARY TRL CONTENT

| FIELD | | EXEMPLARY CONTENT | BIT SIZE |
|---|---|---|---|
| VERSION | | 1 | 8 |
| ISSUER INFORMATION | | ABC | 128 |
| INVALIDATED TERMINAL NO. | | 7 | 4 |
| ID-RELATED INFORMATION | ENTRY NO. | 3 | 4 |
| | ID | '1100'b | 4 |
| | MASK BIT | 2 | 2 |
| | ID | '0110'b | 4 |
| | MASK BIT | 3 | 2 |
| | ID | '0001'b | 4 |
| | MASK BIT | 4 | 2 |
| SIGNATURE INFORMATION | | | 320 |

FIG.17

TRL

| FIELD | | BIT SIZE | |
|---|---|---|---|
| 410 VERSION | | 8 | |
| 420 ISSUER INFORMATION | | 128 | |
| 430 INVALIDATED TERMINAL NO. | | 128 | |
| 440 ID-RELATED INFORMATION | ENTRY NO. (N) | 32 | ← 441 |
| | N × { ID | 128 | ← 442 |
| | MASK BIT | 8 | ← 443 |
| | EXCEPTION ENTRY NO. (M) | 32 | ← 444 |
| | M × EXCEPTION ID | 128 | ← 445 |
| 450 SIGNATURE INFORMATION | | 320 | |

ENCRYPTED DATA DELIVERY SYSTEM

TECHNICAL FIELD

The present invention relates to encryption communications systems, and in particular to an encryption communications system that includes an encryption communications device that does not accept requests from some of a plurality of terminals, and accepts requests from and transmits encrypted data to the other terminals.

BACKGROUND ART

In recent years there has been extensive development of systems for conducting electronic business transactions and the like using the Internet.

Encryption technology is used in data communications conducted as part of electronic business transactions and the like. For example, public key encryption related encryption communications systems are often used for authenticating another communications party, and secret key encryption related encryption communications systems are often used for distributing data safely. Encryption technology relating to public key and secret key encryption systems is described in detail in *Contemporary Encryption Theory* (Nobuichi Ikeno, Kenji Koyama, Institute of Electrical and Electronic Engineers, 1986)

In relation to public key encryption related encryption communications systems, generally a public key certificate, issued by an organ known as the authentication bureau and for verifying the correspondence between a public key and the whoever or whatever has possession of the public key, is sent attached to the public key. The public key certificate is basically public information that does not need to be handled secretly. A secret key paired with a public key, however, needs to be managed secretly.

Normally, a public key certificate has a valid period, although if as the result of an accident or incident a secret key paired with a public key either has been or has possibly been disclosed, the public key certificate needs to be invalidated, even if still within the valid period.

As a method of invalidating a public key certificate, a method involving the public release of a certificate revocation list (CRL) is shown in *Secure Electronic Commerce: Building the Infrastructure for Digital Signatures and Encryption* (Warwick Ford, Michael S. Baum, Prentice Hall, 1997). A CRL includes the serial numbers of all public key certificates to be invalidated, and a mechanism can be constructed that, using a CRL, invalidates and makes unusable public key certificates having serial numbers included in the CRL.

Also, in the case of a distribution service in which a distribution device distributes keys for decrypting digital content (hereafter "content keys") in response to requests from a large number of terminals that receive/playback digital content and which are required to appropriately use video and other digital content encrypted for reasons of copyright protection and the like, the distribution of content keys should, in view of copyright protection and the like, be carried out only with respect to appropriate terminals.

In this distribution service, it is imagined that a distribution system or the like be used in which terminals each have a unique secret key, and a distribution device for distributing keys receives, from a terminal, notification of a terminal identifier (terminal ID) unique to the terminal, together with a content key distribution request, performs on a content key an encryption that is only possible using the secret key unique to the terminal, and transmits the encrypted content key to the terminal.

In this case, if ascertained that a problem exists with a secret key packaging method in a terminal manufactured by a certain manufacturer, it will be necessary to stop distribution of content keys to all terminals produced by this manufacturer.

Furthermore, in relation to a mechanism that, for example, prevents the copying of digital content in a terminal, it will be necessary to stop distribution of content keys to all terminals produced by a certain manufacturer if a method for neutralizing this mechanism in terminals manufactured by the manufacturer is disclosed.

In other words, it will sometimes be necessary to stop the distribution of content keys to terminals that have been corrupted.

As a method of responding to this requirement, a distribution device in a distribution service can be structured to receive a terminal ID together with a content key distribution request from a terminal, to use a "terminal revocation list" (TRL), being a variant of the above CRL in which, instead of the serial numbers of public key certificates, the terminal IDs relating to all terminals to be invalidated are included, to distribute keys in response to a distribution request only when the received terminal ID is not included in the TRL, and to not respond to a distribution request if the terminal ID is included in the TRL.

According to the above method, however, a data size of the TRL when a large number of terminals require invalidating is enormous, since the terminal IDs of all of these terminals are included.

As an example, if 40 terminals are targeted by the distribution service, each terminal ID is a piece of fixed length data of 4 bytes or more, and 1% of these terminals require invalidating, the data size of the TRL will be at least 160 megabytes.

For this reason, in is feared that a distribution service in which, in order to handle a large number of terminals, (i) a large number of distribution devices for distributing content keys are provided and dispersed throughout various regions or the like, (ii) a TRL is generated in a single management device and sent, after having a digital signature included therein, to the distribution devices via a public communications network or the like, and (iii) each distribution device judges, based on the TRL, whether distribution of a content key to a terminal is permissible, will not prove practical because of either the voluminous communication data or the voluminous data that the distribution devices are required to hold.

For example, if a TRL is sent out every time there is an increase in the number of terminals to be invalidated, communication bottlenecks are likely to occur due to the large volume of communication data. Moreover, if a distribution device is structured to request a new TRL from a management device when a distribution request is received from a terminal together with a terminal ID, and, after receiving the TRL, to collate the received terminal ID based on the TRL, the response by the distribution device to the request from the terminal will be delayed as a result of the length of time required in the reception of the TRL.

DISCLOSURE OF THE INVENTION

In view of the above issue, an object of the present invention is to provide an encryption communications system that conducts a service relating to encryption communication, such as encrypting a content key and only distributing the encrypted content key to appropriate terminals (i.e. excluding those terminals to be invalidated) based on a TRL, and that suppresses the data size of the TRL and improves practicability.

A further object of the present invention is to provide various technologies that contribute to the construction of the above encryption communications system.

An encryption communications system provided to achieve the above object includes an encryption communications device, a plurality of terminals that are each operable to transmit to the encryption communications device an identifier, which is a bit string having a predetermined number of bits for identifying the terminal, and a management device that generates invalidated-terminal information showing one or more of the identifiers as information specifying one or more terminals to be invalidated. The management device has an invalidated-terminal information generation unit operable to generate the invalidated-terminal information using a data format that generically expresses, by information specifying a value of a section in a bit string having the predetermined number of bits, all identifiers in which a value of the section matches the specified value; and an output unit operable to output the generated invalidated-terminal information. The encryption communications device has an invalidated-terminal information acquisition unit operable to acquire the invalidated-terminal information outputted by the management device; an identifier receiving unit operable, when an identifier is transmitted from one of the terminals, to receive the identifier; a judging unit operable to judge whether the received identifier matches any of the one or more identifiers shown by the invalidated-terminal information as information specifying one or more terminals to be invalidated; and a communication unit operable (i) when judged to not be any matches, to conduct a predetermined communication with the terminal that transmitted the identifier, by performing an encryption unique to the terminal, and (ii) when judged to be a match, to not conduct the predetermined communication with the terminal.

Here, the encryption communications device is, for example, a content key distribution device as shown in embodiments 1 to 3, the predetermined communication is, for example, the transmission of an encrypted content key, and the invalidated-terminal information is, for example, a TRL ("terminal revocation list") as shown in embodiments 1 to 3.

According to the present invention, all terminal IDs that include a certain bit string are expressed generically by information specifying a value of and a position in a common bit string included in these terminal IDs, and thus it is possible to comparatively suppress the size of the TRL data volume, and as a result, realize a practical encryption communications system that conducts a service related to encryption communication, such as encrypting a content key and only distributing the encrypted content key to appropriate terminals (i.e. excluding those terminals to be invalidated) based on a TRL.

Furthermore, the invalidated-terminal information (i) may include one or more sets of corresponded value and position information, each piece of value information showing a value of a section of a bit string having the predetermined number of bits, and a corresponding piece of position information being for specifying a bit position of the section in the bit string, and (ii) may be information specifying, as a terminal to be invalidated, all terminals identified respectively by all identifiers in which a value of a partial bit string located in a bit position specified by a piece of position information matches a value shown by a piece of value information corresponding to the piece of position information, and the judging unit may (i) verify, for each piece of position information, whether a value, in the received identifier, of a partial bit string located in a bit position specified by the piece of position information matches a value shown by a piece of value information corresponding to the piece of position information, and (ii) judge, when verified that there is at least one match, that the received identifier matches an identifier shown by the invalidated-terminal information.

According to this structure, because the invalidated-terminal information is structured in a format that corresponds a value and a position of a section of a terminal ID, a value of an arbitrary bit string range can express all of the common terminal IDs by information formed from value/position sets, without having to fixedly determine a position of the section by an operational rule or the like, and thus if effectively operated, it is possible to express a large number of invalidated terminals by a small information volume.

Furthermore, the invalidated-terminal information (i) may include one or more sets of corresponded representative information and mask flags, each piece of representative information being a bit string having the predetermined number of bits, and a corresponding mask flag having the predetermined number of bits, and (ii) may be information specifying, as a terminal to be invalidated, all terminals identified by identifiers in which a value of a section having a bit value of "1" in a mask flag matches a value of the section in a piece of representative information corresponding to the mask flag, and the judging unit may (i) verify, for each mask flag, whether an AND of the mask flag and the received identifier matches an AND of the mask flag and a piece of representative information corresponding to the mask flag, and (ii) judge, when verified that there is at least one match, that the received identifier matches an identifier shown by the invalidated-terminal information.

According to this structure, in a format that expresses a large number of terminal IDs by sets which each comprise a value of a section in a terminal ID and a bit position of the section, a bit position structuring the section is shown by a position having a mask flag value set to "1", and a bit position not structuring the section is shown by a position having a mask flag value set to "0". Consequently, it is possible to extract, out of a terminal ID received from a terminal, a section to be collated with a value included in the invalidated-terminal information, by an easy calculation having a small number of computations that involves performing an AND (i.e. logical product) operation on the received terminal ID and a mask flag. This helps to speed up the judgments conducted in the encryption communications device.

Furthermore, the invalidated-terminal information generation unit may generate isolated-value information for including in the invalidated-terminal information, each piece of isolated-value information having the predetermined number of bits, the invalidated-terminal information may be information further specifying, as a terminal to be invalidated, terminals identified by identifiers that match a piece of isolated-value information, and the judging unit may further judge, when the received identifier matches a piece of isolated-value information, that the received identifier matches an identifier shown by the invalidated-terminal information.

Here, isolated-value information is, for example, discrete information as shown in FIG. 8. According to this structure, when a terminal ID of an invalidated terminal does not have a common bit with a terminal ID of other invalidated terminals (i.e. when a terminal ID is discrete), the discrete terminal ID is included in the invalidated-terminal information as isolated-value information, and thus, when there are a large number of invalidated terminals having discrete terminal IDs, it is possible to structure the invalidated-terminal information with a smaller amount of data than when a format is used that expresses the discrete IDs by sets which each consist of a value of a discrete terminal ID and a mask flag in which all the bits are "1".

Furthermore, the invalidated-terminal information (i) may include one or more sets of corresponded significant-digit and value information, each piece of significant-digit information showing a number of bit digits, and a corresponding piece of value information showing a value of a bit string having the number of bit digits, and (ii) may be information specifying, as a terminal to be invalidated, all terminals identified by identifiers in which a value of a bit string having, from a most significant bit, a number of bit digits shown by a piece of significant-digit information matches a value shown by a piece of value information corresponding to the piece of significant-digit information, and the judging unit may (i) verify, for each piece of significant-digit information, whether, in the received identifier, a value of a bit string having, from a most significant bit, a number of bit digits shown by the piece of significant-digit information matches a value shown by a piece of value information corresponding to the piece of significant-digit information, and (ii) judge, when verified that there is at least one match, that the received identifier matches an identifier shown by the invalidated-terminal information.

According to this structure, it is possible to express all terminal IDs having a common value for only an arbitrary number of bits from a most significant bit in the terminal IDs, by value information and significant digit information that shows the arbitrary number of bits. Generally, in the management of terminal IDs, information distinguishing a collection of identifiers or the like of manufacturers that manufacture terminals, or common qualities in terms of structure, function and the like of terminals, is often positioned in the high order bits of a terminal ID. In this way, it is possible to structure the invalidated-terminal information by data of a comparatively small volume, when there are a large number of terminals to be invalidated in relation to a specific manufacturer, product structure, or the like.

Furthermore, the management device may have an identifier acquisition unit operable to acquire the identifiers of all terminals to be invalidated, and the invalidated-terminal information generation unit may (i) specify one or more X values satisfying a condition that, out of the identifiers acquired by the identifier acquisition unit, the number of identifiers which have matching X number of bits from a most significant bit is $2^{(N-X)}$, and (ii) generate the invalidated-terminal information using a data format that generically expresses, for each X value, the $2^{(N-X)}$ identifiers by significant-digit information showing the X number of bit digits, and by value information showing a value of a bit string of X bits from the most significant bit in the $2^{(N-X)}$ identifiers, where N is the predetermined number of bits.

According to this structure, it is possible to construct invalidated-terminal information that suppresses data volume, without placing an unnecessary operational burden on an operator or the like of a management device.

Furthermore, each terminal may be manufactured by one of a plurality of manufacturers, and an identifier identifying the terminal may show the manufacturer of the terminal by a bit string having a predetermined number of bits from a most significant bit in the identifier.

According to this structure, it is possible to express, by sets of low-volume information, all terminal IDs having a constant number of bits from a most significant bit that are common, and information showing a manufacturer is included in the high order bits of the terminal IDs. Thus, it is possible to effectively suppress the data volume of the invalidated-terminal information, when ascertained that a structural problem (e.g. user is able to freely duplicate content by executing a certain procedure) exists with a terminal from a specific manufacturer.

Furthermore, the identifier identifying the terminal may show a product type to which the terminal belongs, by a bit string having a predetermined number of bits that starts from an end of the bit string showing the manufacturer.

According to this structure, when ascertained that a problem exist only with a certain product manufactured by a specific manufacturer, it is possible to suppress the data volume of the required invalidated-terminal information, since all terminals in which the product is mounted are determined as invalidated terminals.

Furthermore, each terminal may hold a decryption key unique to the terminal, and may be further operable to internally store encrypted content, which is content encrypted by a content key, the output unit may conduct the output by transmitting the invalidated-terminal information to the encryption communications device, the encryption communications device may have an encryption key storage unit operable to store encryption keys that correlate one-to-one with the decryption keys of all of the terminals, and a content key storage unit operable to store the content key, the invalidated-terminal information acquisition unit may conduct the acquisition by receiving the invalidated-terminal information transmitted by the output unit, the communication unit, when judged by the judging unit that the received identifier does not match any of the identifiers shown by the invalidated-terminal information, may encrypt the content key using an encryption key that correlates with the decryption key unique to the terminal which transmitted the identifier, and transmit the encrypted content key to the terminal, and each terminal may have a decrypting unit operable to decrypt the encrypted content key transmitted from the encryption communications device, using the decryption key unique to the terminal, and a playback unit operable, when the encrypted content is stored in the terminal, to decrypt the encrypted content using the decrypted content key, and to playback the decrypted content.

According to this structure, when a system is realized in which consideration is given to copyright protection and the like, by restricting playback of content to when a terminal acquires an encrypted content key from an encryption communications device, it is possible, if ascertained that copyright protection is no longer possible for a group of terminals from a certain manufacturer, to suppress the volume of data that has to be sent from a management device to the encryption communications device, and to shorten the transmission time of the data, since information for identifying the group of terminals to be invalidated can be constituted by low-volume data consisting of a number of bit digits showing a section of a terminal ID from a most significant bit to a part indicating a manufacturer ID, and the manufacturer ID.

Furthermore, the invalidated-terminal information (i) may include one or more pieces of generic and exception information, each piece of generic information specifying both a section in a bit string having the predetermined number of bits and a value of the section, and each piece of exception information having the predetermined number of bits, and (ii) may be information specifying, as a terminal to be invalidated, all terminals identified by identifiers in which a section specified by a piece of generic information matches a value specified by the piece of generic information, and which do not match a piece of exception information, and the judging unit may (i) verify whether a section, in the received identifier, specified by a piece of generic information matches a value specified by the piece of generic information, and (ii) judge, when verified that there is a match, that the received identifier matches an identifier shown by the invalidated-terminal information, except when the received identifier matches a piece of exception information.

According to this structure, by employing exception information, it is sometimes possible to specify the terminal IDs of all invalidated terminals by a lower data volume, than when specifying terminal IDs of invalidated terminals using only generic information. Consider an example in which there are 15 invalidated terminals, and the terminal IDs of these terminals all have common bit string values except for the low order 4 bits. Hypothetically it would be possible to construct invalidated-terminal information specifying the terminal IDs of these 15 invalidated terminals by using (i) one piece of generic information to express the terminal IDs of the eight terminals having common bit string values except for the low order 3 bits, (ii) another piece of generic information to express the terminal IDs of the four terminals having common bit string values except for the low order 2 bits, (iii) another piece of generic information to express the terminal IDs of the two terminals having common bit string values except for the least significant bit, and (iv) a value of the terminal ID of the remaining terminal to express the terminal ID of that terminal. In comparison, according to the present invention, it is possible to construct invalidated-terminal information having the same significance, by using one piece of generic information to express the terminal IDs of 16 terminals having common bit strings except for the low order 4 bits, and exception information to express the terminal ID of the one terminal out of the 16 terminal that is not invalidated, and thus suppress the data volume of the invalidated-terminal information.

Furthermore, the management device may have an identifier acquisition unit operable to acquire the identifiers of all terminals to be invalidated, and the invalidated-terminal information generation unit may (i) determine, as the exception information, an N-bit bit string, obtained by inverting only a least significant bit of one of the identifiers acquired by the identifier acquisition unit, satisfying a first condition that the bit string not match any of the identifiers acquired by the identifier acquisition unit, (ii) provisionally designate the determined bit string as an identifier, (iii) specify one or more X values satisfying a second condition that, out of the identifiers acquired by the identifier acquisition unit and the provisionally designated identifier, the number of identifiers which have matching X number of bits from a most significant bit is $2^{(N-X)}$, and (iv) generate the invalidated-terminal information by determining, as the generic information for each specified X value, information specifying the X value and a value of a bit string of X bits from the most significant bit in the $2^{(N-X)}$ identifiers, where N is the predetermined number of bits and X is less than N.

According to this structure, it is possible to construct invalidated-terminal information whose data volume is suppressed under a constant condition, without placing an unnecessarily operational burden on the operator or the like of a management device.

Furthermore, each terminal may hold a unique decryption key, the encryption communications device may have an encryption key storage unit operable to store encryption keys that correlate one-to-one with the decryption keys of all of the terminals, the communication unit, when judged by the judging unit that the received identifier does not match any of the identifiers shown by the invalidated-terminal information, may encrypt communication data using an encryption key that correlates with the decryption key unique to the terminal which transmitted the identifier, and transmit the encrypted communication data to the terminal, and the terminal may decrypt the encrypted communication data transmitted from the encryption communications device, using the decryption key unique to the terminal.

According to this structure, in a system that includes an encryption communications device for conducting a service in which communications data is only sent to legitimate terminals, it is possible to suppress the data volume of invalidated-terminal information required in judging whether or not a terminal is legitimate, even when there are a large number of terminals to be invalidated. As a result, it is possible to plan for a speeding up of the judgment and the like.

Furthermore, the output unit may conduct the output by transmitting the invalidated-terminal information to the encryption communications device, and the invalidated-terminal information acquisition unit may conduct the acquisition by receiving the invalidated-terminal information transmitted by the output unit.

According to this structure, a management device constructs invalidated-terminal information required by an encryption communications device while suppressing data volume, and thus it is possible to transmit the invalidated-terminal information quickly to the encryption communications device.

Furthermore, the output unit may have a mounting subunit operable to mount a storage medium, and may conduct the output by storing the invalidated-terminal information on the mounted storage medium, and the invalidated-terminal information acquisition unit may be operable to mount the storage medium, and may conduct the acquisition by reading the invalidated-terminal information from the mounted storage medium.

According to this structure, it is possible to use a conventional storage medium having a reasonably small acceptable storage capacity, when a management device stores invalidated-terminal information required by an encryption communications device on a storage medium and transfers the storage medium.

A management device provided to achieve the object generates invalidated-terminal information showing, out of a plurality of identifiers identifying a plurality of terminals, the identifiers of one or more terminals to be invalidated, each identifier being a bit string having a predetermined number of bits for identifying a different one of the terminals, and includes an invalidated-terminal information generation unit operable to generate the invalidated-terminal information using a data format that generically expresses, by information specifying a value of a section in a bit string having the predetermined number of bits, all identifiers in which a value of the section matches the specified value; and an output unit operable to output the generated invalidated-terminal information.

As a result of this management device, the invalidated-terminal information to be outputted is able to specify a large number of invalidated terminals by a relatively small data volume, and as a result the invalidated-terminal information to be outputted is readily usable in terms of transmission and storage onto a storage medium.

Furthermore, the invalidated-terminal information (i) may include one or more sets of corresponded value and position information, each piece of value information showing a value of a section of a bit string having the predetermined number of bits, and a corresponding piece of position information being for specifying a bit position of the section in the bit string, and (ii) may be information specifying, as a terminal to be invalidated, all terminals identified respectively by all identifiers in which a value of a partial bit string located in a bit position specified by a piece of position information matches a value shown by a piece of value information corresponding to the piece of position information.

According to this structure, all terminal IDs having a common value of an arbitrary bit string range can be expressed by information formed from value/position sets, without having to fixedly determine a position of a section by operation rules or the like, since the invalidated-terminal information is in a format in which a value of a section of a terminal ID and a position of the section are corresponded, and as a result it is possible, if operated effectively, to express a large number of invalidated terminals by a low information volume.

Furthermore, each terminal may be manufactured by one of a plurality of manufacturers, and an identifier identifying the terminal may show the manufacturer of the terminal by a bit string having a predetermined range in the identifier.

According to this structure, it is possible to effectively suppress the data volume of invalidated-terminal information, in cases such as when it is ascertained that a structural flaw exists in terminals manufactured by a specific manufacturer.

An encryption communications device provided to achieve the above object is for conducting communications with a plurality of terminals, each of which holds an identifier, which is a bit string having a predetermined number of bits for identifying the terminal, and includes an invalidated-terminal information acquisition unit operable to acquire, from an external source, invalidated-terminal information that shows the identifiers of one or more terminals as information for specifying one or more terminals to be invalidated, the invalidated-terminal information being structured using a data format that generically expresses, by information specifying a value of a section in a bit string having the predetermined number of bits, all identifiers in which a value of the section matches the specified value; an identifier receiving unit operable, when an identifier held by a terminal is transmitted from the terminal, to receive the identifier; a judging unit operable to judge whether the received identifier matches any of the one or more identifiers shown by the invalidated-terminal information as information specifying one or more terminals to be invalidated; and a communication unit operable (i) when judged to not be any matches, to conduct a predetermined communication with the terminal that transmitted the identifier, by performing an encryption unique to the terminal, and (ii) when judged to be a match, to not conduct the predetermined communication with the terminal.

According to this structure, it is possible to quickly judge whether a terminal ID received from a terminal is the terminal ID of an invalidated terminal, by obtaining and referring to invalidated-terminal information specifying a large number of invalidated terminals using a relatively low data volume.

Furthermore, the invalidated-terminal information (i) may include one or more sets of corresponded value and position information, each piece of value information showing a value of a section of a bit string having the predetermined number of bits, and a corresponding piece of position information being for specifying a bit position of the section in the bit string, and (ii) may be information specifying, as a terminal to be invalidated, all terminals identified respectively by all identifiers in which a value of a partial bit string located in a bit position specified by a piece of position information matches a value shown by a piece of value information corresponding to the piece of position information, and the judging unit may (i) verify, for each piece of position information, whether a value, in the received identifier, of a partial bit string located in a bit position specified by the piece of position information matches a value shown by a piece of value information corresponding to the piece of position information, and (ii) judge, when verified that there is at least one match, that the received identifier matches an identifier shown by the invalidated-terminal information.

According to this structure, all terminal IDs having a common value of an arbitrary bit string range can be expressed by information formed from value/position sets, without having to fixedly determine a position of a section by operation rules or the like, since the invalidated-terminal information is in a format in which a value of a section of a terminal ID and a position of the section are corresponded, and as a result it is possible, if operated effectively, to express a large number of invalidated terminals by a low information volume.

An information generation method provided to achieve the above object generates invalidated-terminal information for specifying one or more terminals to be invalidated out of a plurality of terminals, and includes an identifier acquisition step of acquiring identifiers of terminals to be invalidated, each identifier being a bit string having a predetermined number of bits for identifying a different one of the terminals; and an invalidated-terminal information generation step of generating the invalidated-terminal information to show all of the identifiers acquired in the identifier acquisition step, using a data format that generically expresses, by information specifying a value of a section in a bit string having the predetermined number of bits, all identifiers in which a value of the section matches the specified value.

According to this structure, it is possible to construct information for specifying a large number of invalidated terminals while suppressing data volume.

A computer-readable storage medium provided to achieve the above object stores invalidated-terminal data, and in order to specify, out of a plurality of identifiers that are bit strings having a predetermined number of bits for identifying a different one of a plurality of terminals, the identifiers of one or more terminals to be invalidated, the invalidated-terminal data (i) has an identifier-specifying field that stores section information for specifying a value of a section of a bit string having the predetermined number of bits, and (ii) generically expresses, by the section information, all identifiers in which a value of the section matches the specified value.

In order to specify, out of a plurality of identifiers that are bit strings having a predetermined number of bits for identifying a different one of a plurality of terminals, the identifiers of one or more terminals to be invalidated, invalidated-terminal data provided to achieve the above object (i) has an identifier-specifying field that stores section information for specifying a value of a section of a bit string having the predetermined number of bits, and (ii) generically expresses, by the section information, all identifiers in which a value of the section matches the specified value.

According to these structures, all terminal IDs that include a certain bit string are expressed generically by information specifying a value and a position of a common bit string included therein, and thus it is possible to comparatively suppress the data volume of invalidated-terminal data.

An encryption communications system provided to achieve the above object includes an encryption communications device, a plurality of terminals that each transmit to the encryption communications device a key identifier having a predetermined number of bits, and a management device that generates invalidated-identifier information specifying one or more key identifiers to be invalidated. The management device has an invalidated-identifier information generation unit operable to generate the invalidated-identifier information using a data format that generically expresses, by information specifying a value of a section in a bit string having the predetermined number of bits, all identifiers in which a value of the section matches the specified value; and an output unit operable to output the generated invalidated-identifier information. The encryption communications device has an acquisition unit operable to acquire the invalidated-identifier information outputted by the management device; an identifier receiving unit operable to receive a key identifier transmitted from one of the plurality of terminals; a judging unit operable to judge whether the received key identifier matches any of the one or more key identifiers specified by the invalidated-identifier information; and a communication unit operable, only when judged to not be any matches, to conduct a predetermined communication with the terminal that transmitted the key identifier, by performing an encryption relating uniquely to the key identifier.

According to this structure, the volume of data required in authenticating the legitimacy of a key identifier can be suppressed, and thus it is possible to enhance the practicability of a system that conducts a service such as performing a predetermined communication involving, for example, the transmission of specific valuable data only to terminals that send a legitimate key identifier.

BRIEF DESCRIPTION OF THE DRAWINGS

FIG. 4 shows exemplary content of data stored in an encryption key storage unit 124 of a content key distribution device 120;

FIG. 8 shows a data structure of a TRL in embodiment 1;

FIG. 9 shows exemplary content of a TRL;

FIG. 12 shows a data structure of a terminal ID in an embodiment 2;

FIG. 13 shows a data structure of a TRL in embodiment 2;

FIG. 15 shows exemplary content of a TRL;

FIG. 17 shows a data structure of a TRL in an embodiment 3;

BEST MODE FOR CARRYING OUT THE INVENTION

The following describes, with reference to the drawings, a content key distribution system, which is an embodiment of the present invention applied as a system that takes into consideration copyright protection and the like of content.

Embodiment 1

System Structure

Figure 1:
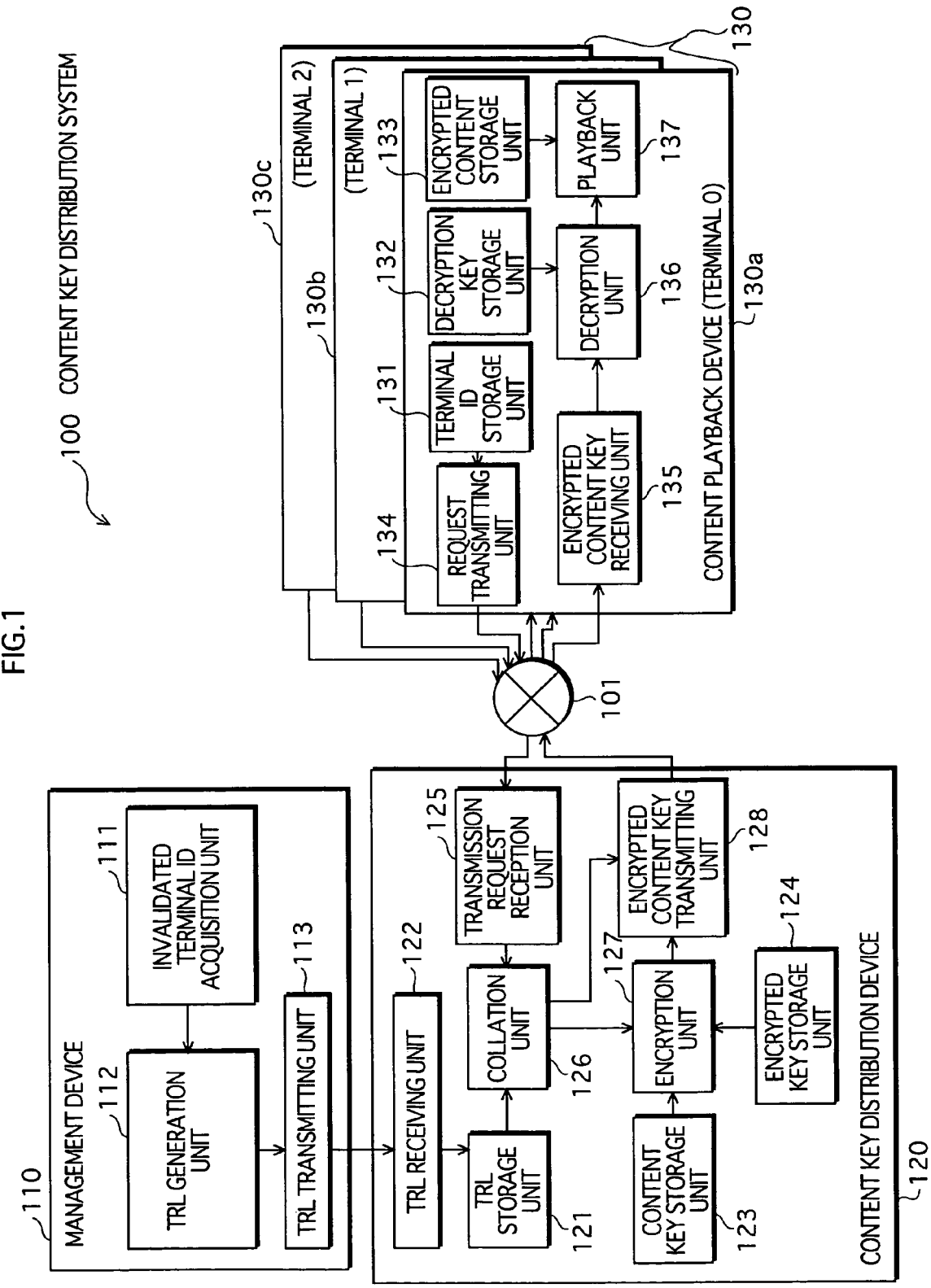
FIG. 1 is a structural diagram of a content key distribution system according to an embodiment 1 of the present invention.

FIG. 1 is a structural diagram of a content key distribution system according to an embodiment 1 of the present invention.

Content key distribution system 100 is structured to include a plurality of content playback devices 130 for playing back content, a content key distribution device 120 for distributing encrypted content keys in response to requests from the content playback devices, and a management device 110 for sending, to content key distribution device 120, a terminal revocation list (TRL), which is information used for judging whether distribution of an encrypted content key is permissible. Here, either one or a plurality of content key distribution devices 120 is provided in the content key distribution system.

Here, content playback devices 130a, 130b and the like are, for example, each disposed in a different household, and function to acquire encrypted content via a communication channel, storage media or the like, and to decode and playback the acquired content using a content key.

In a system in which consideration is given to copyright protection, it is assumed that content will be encrypted and then targeted for circulation. For this reason, if a content playback device does not obtain a content key by decrypting an encrypted content key receiving from content key distribution device 120, an encrypted content cannot be decrypted and played back. Content playback devices 130 (hereafter "terminals") each includes a CPU, a hard disk, a mechanism for communicating with an external unit, and the like, and conduct content playback processing for playing back movies and other content for viewing, listening to or the like by a user, via a display device, a speaker or the like. Functionally, each terminal has a terminal ID storage unit 131, a decryption key storage unit 132, a encrypted content storage unit 133, a request transmitting unit 134, an encrypted content key receiving unit 135, a decryption unit 136, and a playback unit 137.

Terminal ID storage unit 131 is a storage area in a ROM (read only memory) or the like, and stores terminal IDs that are for identifying the various terminals. If, for example, 16 terminals are used in content key distribution system 100, the terminal IDs will be structured by bit strings of four or more bits that allow identification of the 16 terminals, and if, for example, there are 50 terminals, the terminal IDs will be bit strings in excess of 32 bits. For ease of understanding, embodiment 1 will be described mainly in relation to there been 16 terminals and 4-bit terminal IDs.

Decryption key storage unit 132 is a storage area in a ROM or the like that stores a decryption key used for decrypting an encrypted content key. The decryption key is a secret key having a value that is unique for each terminal, and is structured, for example, by 128 bits.

Encrypted content storage unit 133 is a storage area on a storage medium such as a hard disk, and stores encrypted content. The terminals each function to acquire (by receiving transmission, etc.) encrypted content from an external source, and to store the encrypted content in unit 133.

Request transmitting unit 134 functions to send transmission request information that includes a terminal ID stored in terminal ID storage unit 131 to content key distribution device 120, via a communication channel 101 (i.e. public network, etc.).

Encrypted content key receiving unit 135 functions, when an encrypted content key is sent from content key distribution device 120, to receive the encrypted content key.

Decryption unit 136 functions, when an encrypted content key is received by encrypted content key receiving unit 135, to decrypt the encrypted content key using a decryption key stored in decryption key storage unit 132, and to send a content key obtained as a result of the decryption to playback unit 137.

Playback unit 137 functions to decrypt encrypted content stored in encrypted content storage unit 133 using a content key sent from decryption unit 136, and to playback the decrypted content. A user is able to view, listen to or the like content played back by playback unit 137.

Some of the functions conducted by request transmitting unit 134, decryption unit 136 and playback unit 137 are realized by a control program stored in a memory being executed by a CPU.

Management device 110 is, for example, a computer or the like installed in an organization that conducts operations relating to the protection of the copyright and the like of content. Management device 110 conducts TRL generation/transmission processing for generating a TRL that has as main content, information for specifying all terminals with respect to which protection of copyright and the like can no longer be guaranteed due to a decryption key stored therein having been disclosed (i.e. all terminals to which an encrypted content key should not be distributed), and for transmitting the generated TRL to content key distribution device 120. Hereafter, terminals to which an encrypted content key should not be distributed are referred to as "invalidated terminals".

Management device 110, as shown in FIG. 1, includes an invalidated-terminal ID acquisition unit 111, a TRL generation unit 112, and a TRL transmitting unit 113.

Here, invalidated-terminal ID acquisition unit 111 functions to acquire information specifying terminal IDs related to all invalidated terminals, and to provide the acquired terminal IDs to TRL generation unit 112.

TRL generation unit 112 functions to generate a TRL whose main content is information specifying invalidated terminals, based on the terminal IDs provided by invalidated-terminal ID acquisition unit 111, and to send the generated TRL to TRL transmitting unit 113. The generation of a TRL is described in detail in a later section.

TRL transmitting unit 113 functions to transmit a TRL sent from TRL generation unit 112 to content key distribution device 120 via a communication channel.

The procedures involved in the TRL generation/transmission processing conducted by management device 110 are described in a later section.

It is assumed that, for example, periodically or when there is a change in invalidated terminal information to be included in a TRL, management device 110 operates to transmit a TRL to content key distribution device 120.

Content key distribution device 120 is a computer that conducts content key distribution processing, which involves transmitting, when a terminal from which a content key transmission request is received is not an invalidated terminal, an encrypted content key to the terminal. Functionally, device 120 includes a TRL storage unit 121, a TRL receiving unit 122, a content key storage unit 123, an encryption key storage unit 124, a transmission request reception unit 125, a collation unit 126, an encryption unit 127, and an encrypted content key transmitting unit 128.

Here, TRL storage unit 121 is an area on a storage medium such as a hard disk, and stores a TRL.

TRL receiving unit 122 functions to receive a TRL transmitted from management device 110, and to store the received TRL in TRL storage unit 121.

Content key storage unit 123 is a storage area in a memory or the like, and stores a content key.

Encryption key storage unit 124 is an area on a hard disk or the like, and stores in advance for each terminal, a terminal ID of the terminal and an encryption key that correlates with a decryption key of the terminal, so that the terminal ID and the encryption key correspond.

Transmission request reception unit 125 functions to receive a transmission request sent from a terminal via a public network, and convey the terminal ID included in the transmission request to collation unit 126.

Collation unit 126 functions to judge whether the terminal from which a transmission request originated is an invalidated terminal, by collating whether there is a match with any of the invalidated terminals specified by a TRL, to convey an instruction to encrypted content key transmitting unit 128 showing that an error message should be returned to the transmission source when judged to be an invalidated terminal, and to convey to encryption unit 127 a terminal ID conveyed from transmission request reception unit 125 when judged not to be an invalidated terminal.

Encryption unit 127 functions, when a terminal ID is conveyed from collation unit 126, to generate an encrypted content key, by using an encryption key corresponded to the terminal ID in encryption key storage unit 124 to encrypt a content key stored in content key storage unit 123, and to send the encrypted content key to encrypted content key transmitting unit 128.

Encrypted content key transmitting unit 128 functions to transmit an error message to a terminal that issued a transmission request when an instruction showing to return an error message is conveyed from collation unit 126, and to transmit an encrypted content key to a terminal that issued a transmission request when an encrypted content key is conveyed from encryption unit 127.

Terminal IDs, Decryption Keys and Encryption Keys

Figure 2:
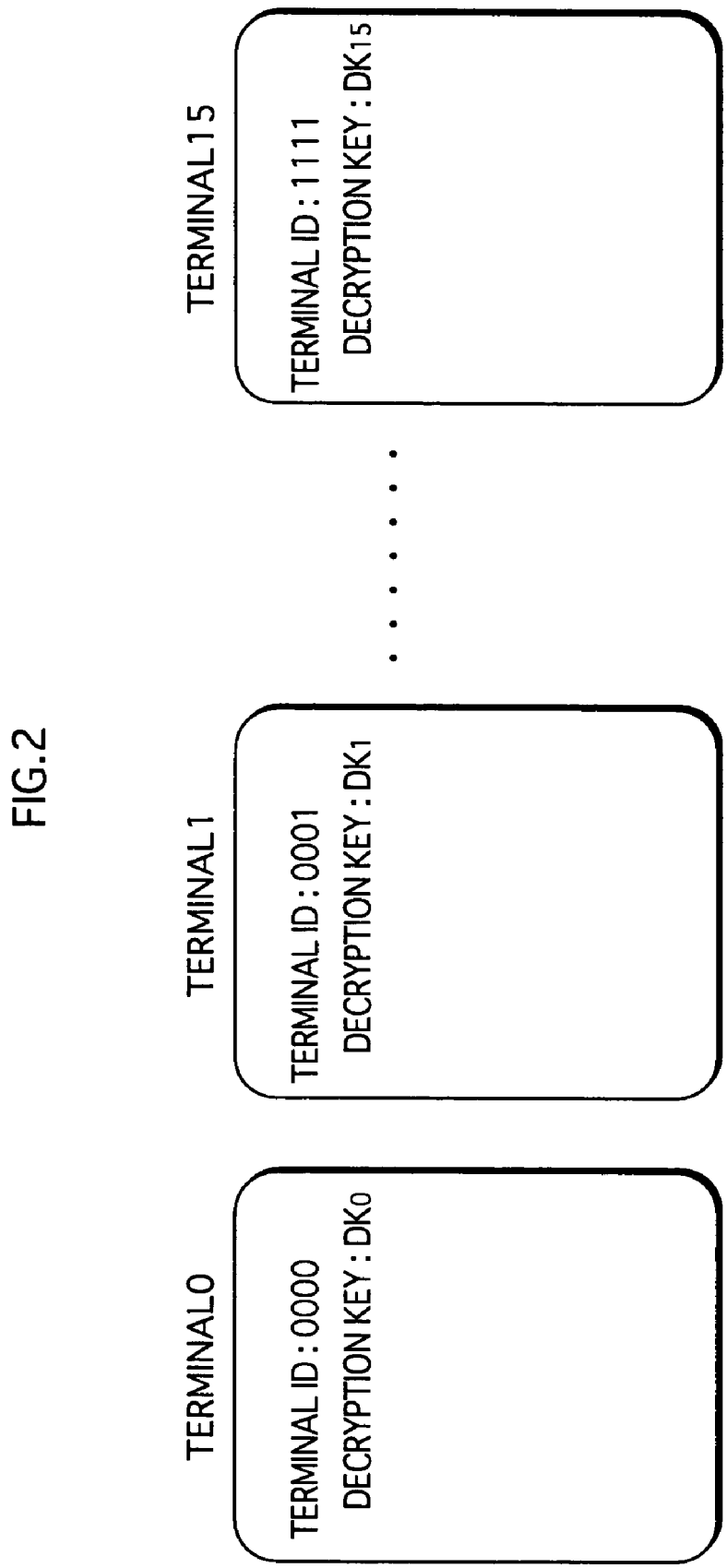
FIG. 2 shows terminal IDs and decryption keys stored by terminals.

FIG. 2 shows terminal IDs and decryption keys stored by the terminals.

Content key distribution system 100 includes 16 terminals, and when the terminal IDs are each 4 bits, as shown in FIG. 2, a terminal 0, for example, holds a terminal ID "0000" and a decryption key "$DK_0$", a terminal 1 holds a terminal ID "0001" and a decryption key "$DK_1$", and a terminal 15 holds a terminal ID "1111" and a decryption key "$DK_{15}$". Decryption keys $DK_0$, $DK_1$, ..., $DK_{15}$ are all bit strings whose individual values do not match. The terminals protect the decryption keys in a secret state using tamper-resistant technology and the like.

Figure 3:
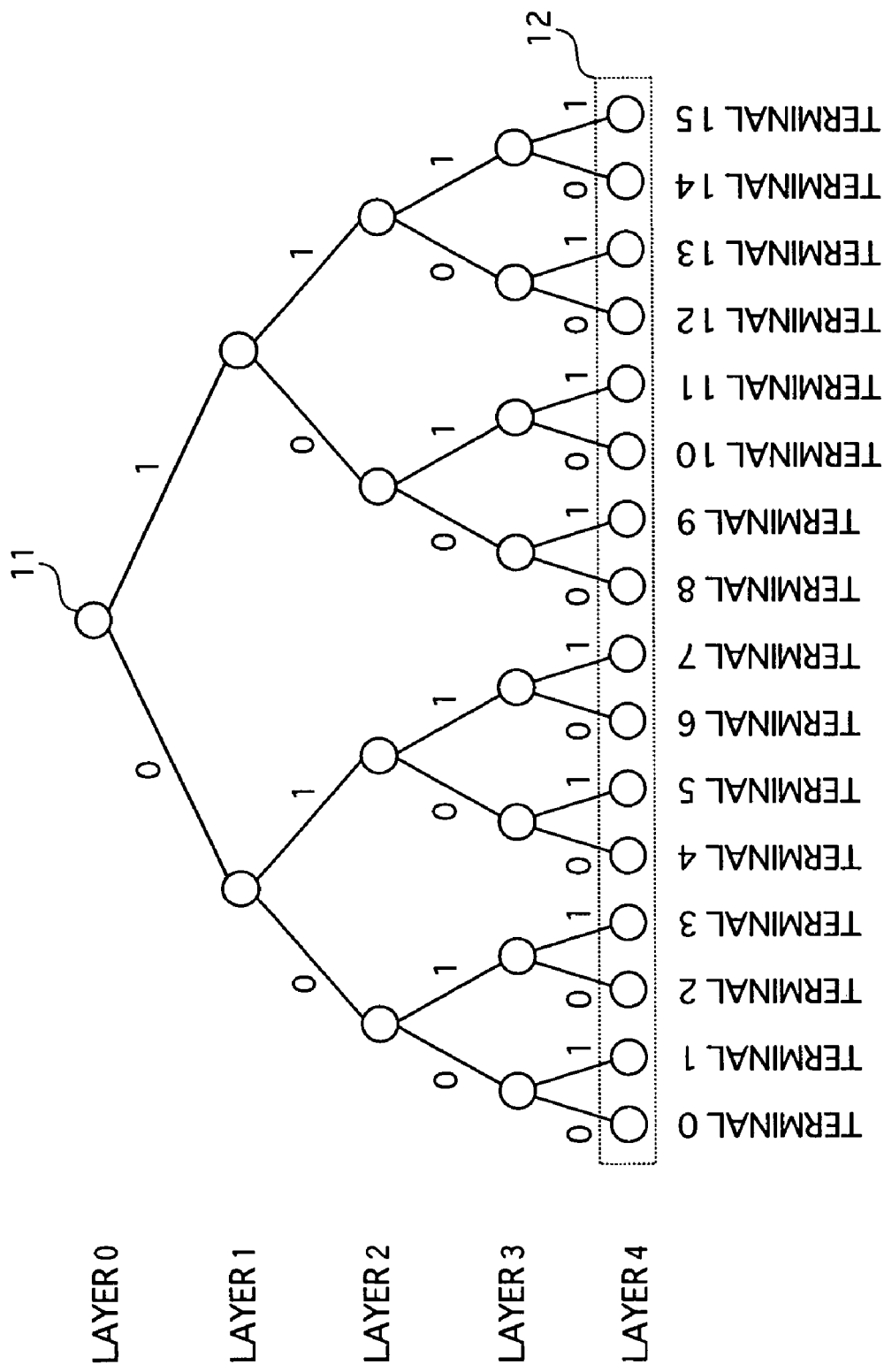
FIG. 3 is a conceptual diagram showing a method for determining a value of terminal IDs held by terminals.

FIG. 3 is a conceptual diagram showing a method for determining a value of terminal IDs held by terminals.

The allotment of terminal IDs to terminals manufactured by various manufacturers is determined, for example, by an organization for conducting operations relating to the protection of copyright and the like, and when the terminals are manufactured, the manufacturers, in accordance with the allotment, configure, in each terminal, a ROM or the like storing the terminal ID allotted to the terminal.

Given that the circles in FIG. 3 are "nodes", and the lines connecting the nodes are "paths", a binary tree structure is determined in FIG. 3 such that the 16 terminals are corresponded one-to-one with nodes 12 on the lower-most layer, and either a 0-value or a 1-value is consigned to each of the two paths from one node to nodes on a lower layer.

The terminal ID of each terminal is expressed by a bit string obtained by joining together, from higher to lower layers, the 0 or 1 values consigned to all of the paths connecting a node 11 on the upper-most layer to a node 12 on the lower-most layer corresponding to the terminal. Consequently, the terminal IDs relating to the terminals are determined as shown in FIG. 2.

FIG. 4 shows exemplary content of data stored in encryption key storage unit 124 of content key distribution device 120.

In encryption key storage unit 124 are stored, as shown in FIG. 4, corresponded terminal IDs and encryption keys for all of the terminals.

For example, encryption key $EK_0$ is corresponded to terminal ID 0000, encryption key $EK_0$ being a key that correlates with decryption key $DK_0$ held in terminal 0. Consequently, data encrypted using encryption key $EK_0$ can be decrypted using decryption key $DK_0$.

Encryption key $EK_i$ and correlated decryption key $DK_i$ form a pair, and are matched when using a secret key encryption system in an encryption algorithm for encrypting a content key, and are not matched when using a public key encryption system.

System Operations

The following is a summary of the system operations of content key distribution system 100.

Operations of Management Device

Figure 5:
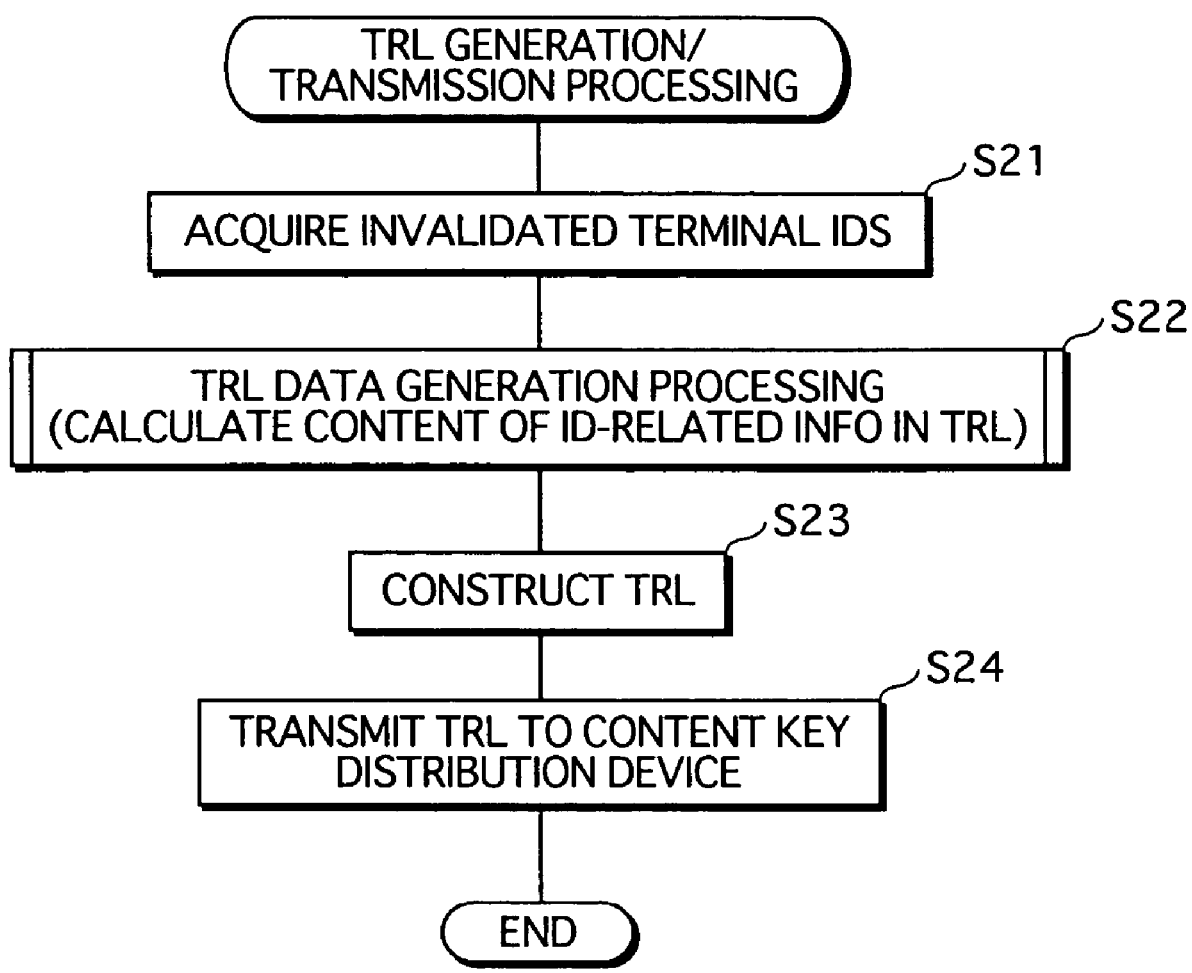
FIG. 5 is a flowchart showing TRL generation/transmission processing conducted by a management device 110.

FIG. 5 is a flowchart showing TRL generation/transmission processing conducted by management device 110.

TRL generation unit 112 in management device 110 acquires terminal IDs relating to invalidated terminals from invalidated-terminal ID acquisition unit 111 (step S21), and conducts TRL data generation processing that involves calculating a content of an information part (hereafter "ID-related information") of a TRL for specifying invalidated terminals (step S22). The TRL data generation processing is described in detail in a later section.

After the TRL data generation processing, TRL generation unit 112 constructs a TRL that includes the generated ID-related information (step S23), conveys the generated TRL to TRL transmitting unit 113, and TRL transmitting unit 113, having received the TRL, transmits the received TRL to content key distribution device 120 via a communication channel (step S24).

Operations of Content Playback Device

Figure 6:
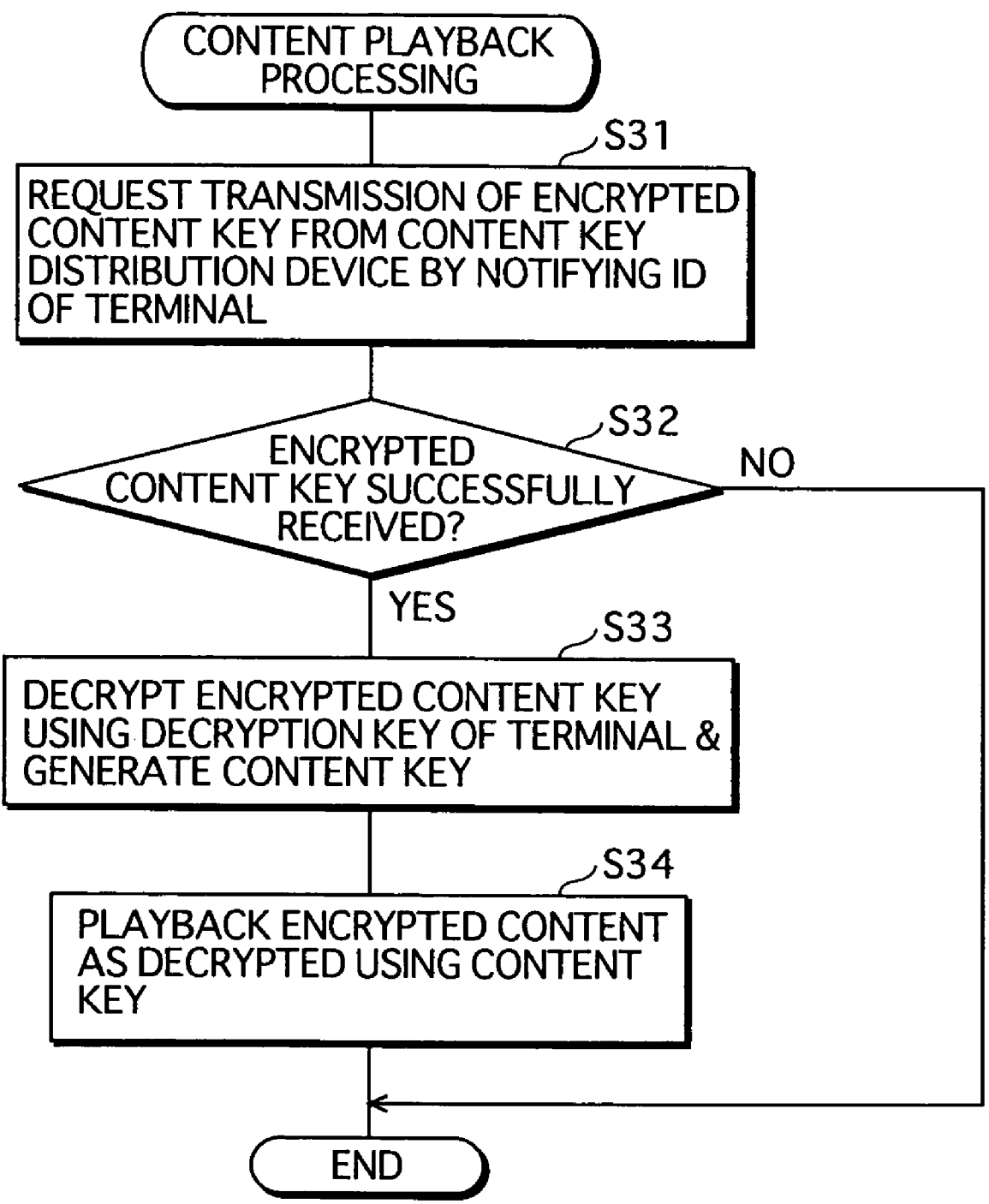
FIG. 6 is a flowchart showing content playback processing conducted by a content playback device 130.

FIG. 6 is a flowchart showing content playback processing conducted by content playback device 130.

Content playback device 130 (terminal) conducts content playback processing on receipt, for example, of a user operation instructing content playback.

First, request transmitting unit 134 in a terminal requests the transmission of an encrypted content key, by transmitting, via a communication channel, a transmission request constituted by data that includes a terminal ID unique to the terminal and stored in terminal ID storage unit 131 (step S31). In response to the request, either an encrypted content key or an error message is sent from content key distribution device 120.

After the transmission request, encrypted content key receiving unit 135 judges whether reception of the encrypted content key was successful (step S32), and conveys the encrypted content key to decryption unit 136 only when the encrypted content key is received normally. On receipt of the encrypted content key, decryption unit 136 decrypts the encrypted content key using a decryption key held in decryption key storage unit 132, and conveys a content key obtained as a result of the decryption to playback unit 137 (step S33).

When a content key is conveyed, playback unit 137 decrypts encrypted content stored in encrypted content storage unit 133 using the content key, and plays back the content as it is being decrypted (step S34). As a result of this playback, video, audio and the like is, for example, outputted via a display device, a speaker and the like, thus allowing a user to view/listen to the content.

Operations of Content Key Distribution Device

Figure 7:
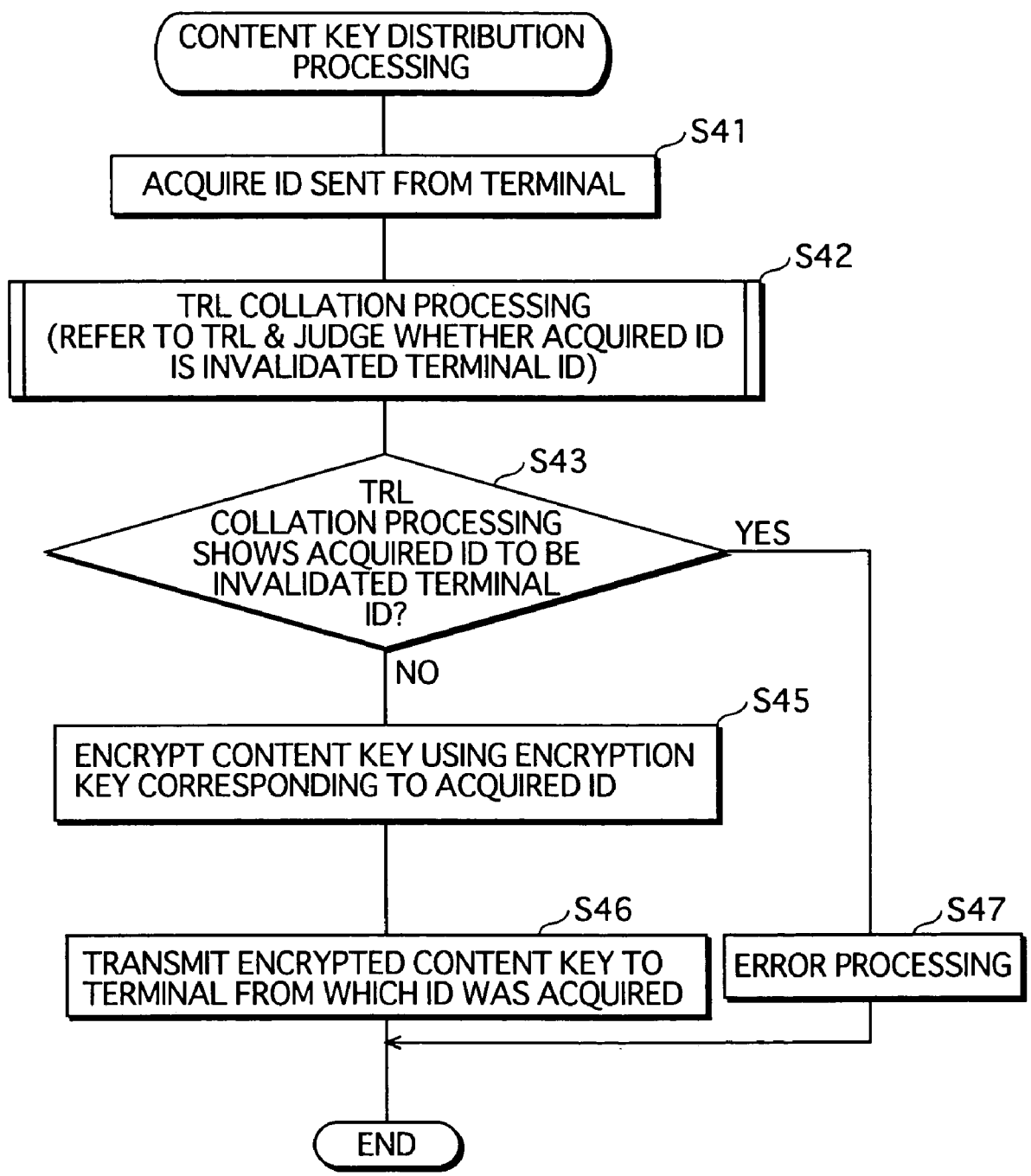
FIG. 7 is a flowchart showing content key distribution processing conducted by content key distribution device 120.

FIG. 7 is a flowchart showing content key distribution processing conducted by content key distribution device 120.

Content key distribution device 120 receives, via receiving unit 122, and stores a TRL in storage unit 121 at least once before conducting the content key distribution processing, and conducts the content key distribution processing whenever a transmission request is sent from one of content playback devices 130.

When a transmission request is sent from one of content playback devices 130 (terminal), transmission request reception unit 125 receives the transmission request and conveys a terminal ID included in the received transmission request to collation unit 126 (step S41).

When a terminal ID is conveyed, collation unit 126 conducts TRL collation processing that involves referring to a TRL and judging whether the terminal ID is the terminal ID of an invalidated terminal (step S42). The TRL collation processing is described in detail in a later section.

When, as a result of the TRL collation processing, a terminal ID relating to the transmission request is judged to be the terminal ID of an invalidated terminal (step S43=YES), collation unit 126 conveys to encrypted content key transmitting unit 128 an instruction showing that an error message should be returned to the transmission source of the transmission request, and in response, unit 128 conducts error processing that involves an error message being transmitted to the terminal (step S47), and ends the content key distribution processing.

If in step S43, it is judged, as a result of the TRL collation processing, that a terminal ID relating to the transmission request is not the terminal ID of an invalidated terminal (step S43=NO), collation unit 126 conveys the terminal ID relating to the transmission request to encryption unit 127, and on receipt of the terminal ID, encryption unit 127 extracts an encryption key corresponding to the terminal ID from encryption key storage unit 124, uses the extracted encryption key to encrypt a content key stored in content key storage unit 123, thus generating an encrypted content key, and conveys the encrypted content key to encrypted content key transmitting unit 128 (step S45).

When an encrypted content key is conveyed, encrypted content key transmitting unit 128 transmits the encrypted content key to the terminal that issued the transmission request (step S46), and ends the content key distribution processing.

TRL Structure

FIG. 8 shows a data structure of a TRL in embodiment 1.

Although the bit size example given in FIG. 8 assumes that there are 16 terminals, exemplary bit sizes corresponding to when there are several times as many terminals are show in parenthesis for reference purposes as a further practical example. The following description refers to the bit size example for 16 terminals.

As shown in FIG. 8, a TRL is structured from 8-bit version information 210, ID-related information 220, and 64-bit signature information 230.

Version information 210 is information showing a version number of a TRL, and the version number changes, for example, every time a TRL with different content is newly generated.

ID-related information 220 is structured from group information 221 and discrete information 225.

Group information 221 includes one or a plurality of ID 223/mask data 224 sets, and an entry number 222 showing the number of sets. If the number of sets is given as M, a value shown by entry number 222 will be M.

Here, mask data 224 is data in which X number of high order bits in the 4-bit bit string structuring mask data 224 have a value of "1", and any remaining low order bits have a value of "0", X thus being expressed by this mask data.

ID 223 forming a set with mask data 224 that expresses X, is data in which only a content of X number of bits from the most significant bit ("MSB") in the 4-bit bit string structuring ID 223 is useful, the remaining bits having a value of "0", for example.

All terminal IDs in which the high order X bits expressed by mask data 224 match a value of ID 223 (i.e. the terminal IDs of $2^{(4-X)}$ number of invalidated terminals) are shown by the sets of ID 223/mask data 224.

Consequently, group information 221 is formed from one or a plurality of sets that expresses the terminal IDs of a plurality of invalidated terminals generically.

Discrete information 225 includes one or a plurality of IDs 227, and includes an entry number 226 that shows the number of IDs 227. If the number of IDs is given as N, a value shown by entry number 226 will be N.

IDs 227 each show a terminal ID of an invalidated terminal. Consequently, discrete information 225 is formed from one or a plurality of pieces of information that expresses the terminal IDs of invalidated terminals discretely.

Signature information 230 is a so-called digital signature generated to reflect the entirety of version information 210 and ID-related information 220.

FIG. 9 shows exemplary content of a TRL.

In FIG. 9 is illustrated a TRL that includes (i) as group information, a set consisting of an ID 223 having a bit string "1100" and mask data 224 having a bit string "1100", and a further set consisting of an ID 223 having a bit string "0110" and mask data 224 having a bit string "1110", and (ii) as discrete information, an ID 227 having a bit string "0001".

The terminal IDs of four invalidated terminals (i.e. 1100, 1101, 1110, 1111) are expressed by the set formed by the "1100" mask data and the "1100" ID, and the terminal IDs of two invalidated terminals (i.e. 0110, 0111) is expressed by the set formed by the "1110" mask data and the "0110" ID.

Consequently, the TRL in FIG. 9 shows the terminal IDs of a total of seven invalidated terminal; six terminals by group information, and one terminal by discrete information.

TRL Data Generation Processing

Figure 10:
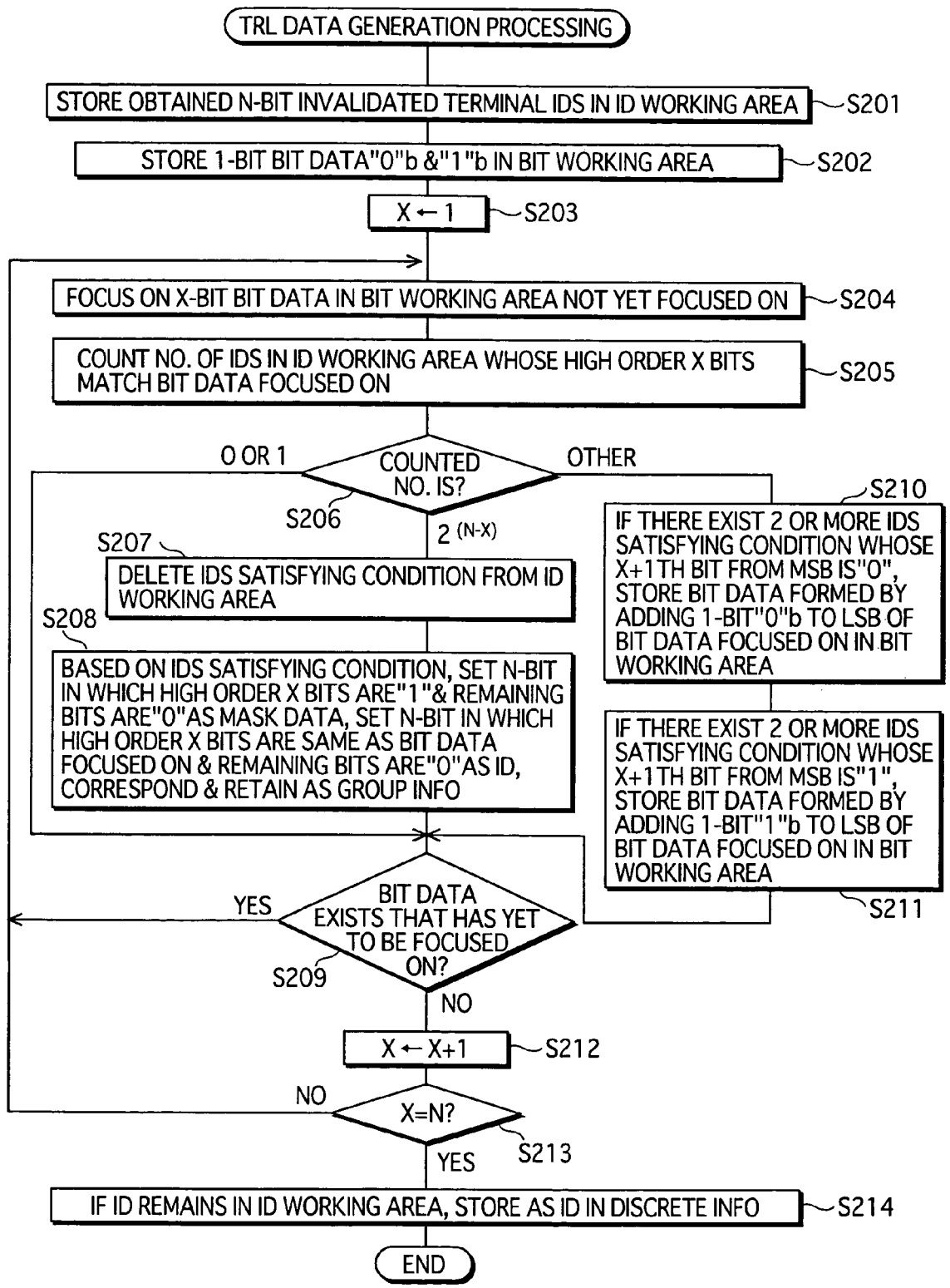
FIG. 10 is a flowchart showing TRL data generation processing, which is a part of the TRL generation/transmission processing conducted by management device 110 in embodiment 1.

FIG. 10 is a flowchart showing TRL data generation processing, which is a part of the TRL generation/transmission processing conducted by management device 110 in embodiment 1.

TRL generation unit 112 in management device 110 conducts TRL data generation processing after acquiring terminal IDs related to invalidated terminals from invalidated-terminal ID acquisition unit 111 (see FIG. 5).

First, TRL generation unit 112 stores the acquired terminal IDs in a ID working area which is an area on a storage medium such as a memory or the like (step S201), stores two pieces of 1-bit bit data "0" and "1" in a bit working area which is an area on a storage medium such as a memory or the like (step S202), and sets "1" in variable X (step S203).

Next, TRL generation unit 112 focuses on a piece of X-bit bit data in the bit working area that has not been focused on (step S204), and counts the number of terminal IDs stored in the ID working area that satisfy a condition that the high order X bits match the bit data currently being focused on (step S205).

When the counted number in step S205 is $2^{(4-X)}$ (step S206), TRL generation unit 112 deletes the terminal IDs satisfying the condition in step S205 (step S207), and with respect to the terminal IDs satisfying the condition, determines a 4-bit bit string having the high order X bits set to "1" and the remaining bits set to "0" as mask data, and determines a 4-bit bit string having the high order X bits set to be the same as the bit data currently being focused on and the remaining bits set to "0" as an ID, corresponds and retains the determined mask data and ID in an area of a storage medium (e.g. memory, etc.) as group information (step S208), and conducts the step S209 judgment.

When the counted number in step S205 is 0 or 1 (step S206), TRL generation unit 112 skips steps S207 and S208, and conducts the step S209 judgment.

In the case that the counted number in step S205 is not any of $2^{(4-X)}$, 0 or 1 (step S206), if two or more of the terminal IDs satisfying the condition in step S205 have an X+1$^{th}$ bit from the MSB that is "0", TRL generation unit 112 stores, in the bit working area, bit data formed by adding a 1-bit "0" to the least significant bit ("LSB") of the bit data being focused on (step S210), and if two or more of the terminal ID satisfying the condition have an X+1$^{th}$ bit from the MSB that is "1", TRL generation unit 112 stores, in the bit working area, bit data formed by adding a 1-bit "1" to the low order of the bit data being focused on (step S211), and conducts the step S209 judgment.

In step S209, TRL generation unit 112 judges whether there exists a piece of X-bit bit data that has yet to be focused on, and when there exists a piece of X-bit bit data yet to be focused on (S209=YES), TRL generation unit 112 returns to step S204, and conducts processing to focus on the next piece of bit data, and when there does not exist a piece of X-bit bit data yet to be focused on (S209=NO), TRL generation unit 112 increases variable X by "1" (step S212), and judges whether variable X equals "4" (step S213).

When variable X does not equal "4" (S213=NO), TRL generation unit 112 returns to step S204, and conducts processing to focus on the next piece of bit data, and when variable X equals "4" (S213=YES), and if there remain terminal IDs in the ID working area, TRL generation unit 112 stores the remaining terminal IDs in an area of a storage medium (e.g. memory, etc.) as IDs in discrete information (step S214), thus ending the TRL data generation processing.

Here, the TRL construction shown in step S23 of FIG. 5 is executed by adding, in addition to version information and signature information, respective entry numbers to the group information and discrete information retained in an area of a storage medium as a result of the above TRL data generation processing.

Consequently, when the seven terminal IDs "0001", "0110", "0111", "1100", "1101", "1110", and "1111" are acquired from invalidated-terminal ID acquisition unit 111, a TRL having the content shown in FIG. 9 is generated as a result of the above procedures. This TRL shows, in FIG. 3, a group consisting of adjacent terminals 6 and 7, a group consisting of terminals 12 to 15, and terminal 1 to be invalidated terminals.

Furthermore, when there is not even one invalidated terminal, the entry number in both the group information and the discrete information will be "0".

TRL Collation Processing

Figure 11:
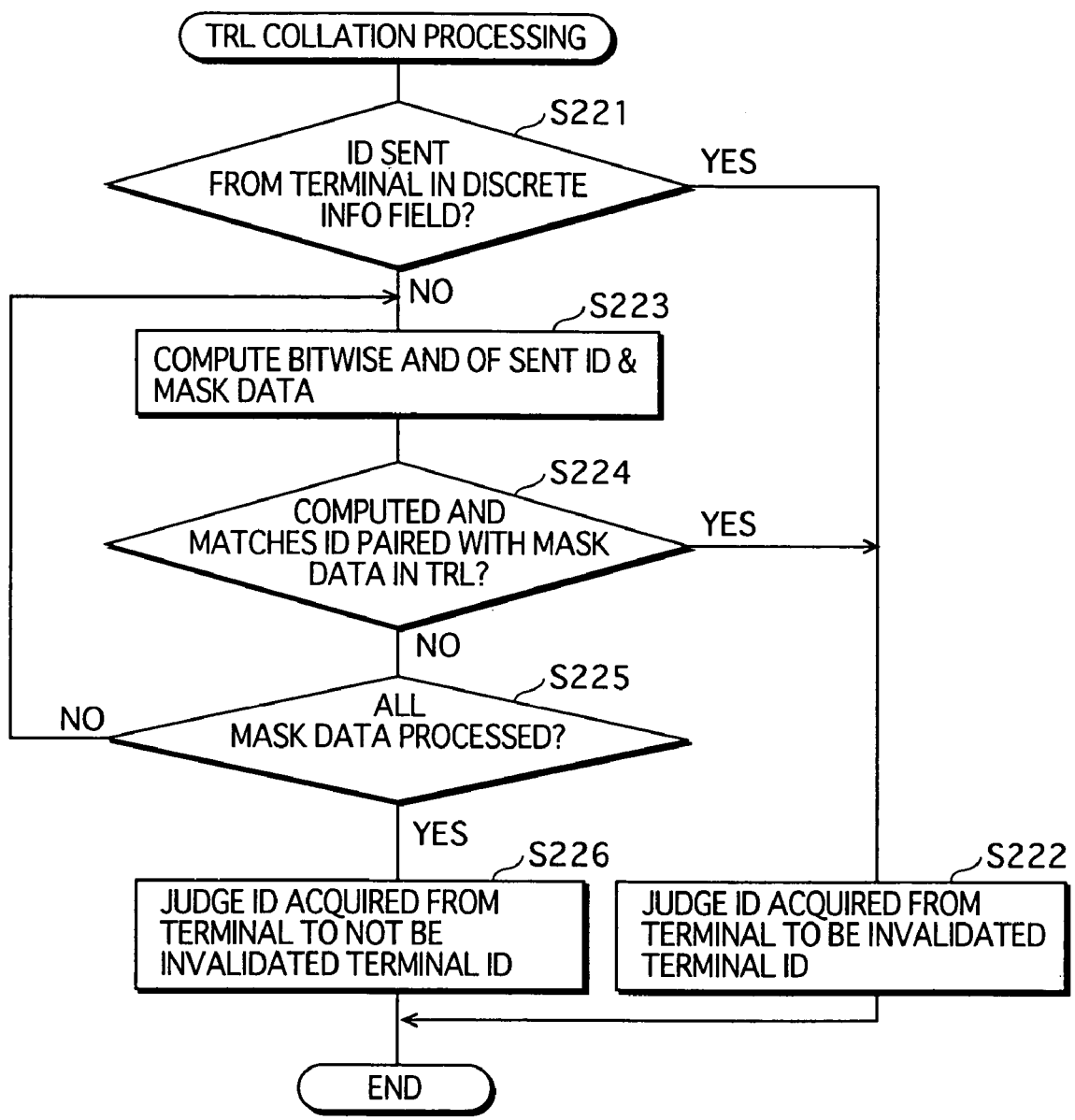
FIG. 11 is a flowchart showing TRL collation processing, which is a part of the content key transmission processing conducted by content key distribution device 120 in embodiment 1.

FIG. 11 is a flowchart showing TRL collation processing, which is a part of the content key transmission processing conducted by content key distribution device 120 in embodiment 1.

Collation unit 126 in content key distribution device 120 conducts TRL collation processing every time a terminal ID sent from a terminal is obtained by transmission request reception unit 125.

Collation unit 126 judges whether an ID 227 that matches a terminal ID sent from a terminal exists in discrete information 225 stored in TRL storage unit 121 (step S221), and if there is a matching ID 227, collation unit 126 judges the terminal ID acquired from the terminal to be the terminal ID of an invalidated terminal (step S222), and ends the TRL collation processing.

In step S221, when judged that an ID 227 matching the terminal ID sent from the terminal is not included in discrete information 225 of the TRL, collation unit 126 checks whether any of the terminal IDs shown by each set of ID 223 and mask data 224 in the group information of the TRL matches the terminal ID sent from the terminal (step S223, S224).

More specifically, collation unit 126 computes a bitwise AND (i.e. a logical product operation carried out in a bitwise fashion) of the terminal ID sent from the terminal and mask data 224 (step S223), judges whether the computed AND matches an ID 223 forming a set with the mask data (step S224), and if matched (S224=YES), judges the terminal ID acquired from the terminal to be the terminal ID of an invalidated terminal (step S222), and ends the TRL collation processing.

If not matched in step S224 (S224=NO), collation unit 126 judges whether the step S223 and S224 processing has been conducted for all the sets of ID 223 and mask data 224 in the group information in the TRL (step S225), and if the processing has not been completed (S225=NO), collation unit 126 again conducts the step S223 and S224 processing.

If judged in step S225 that the processing has been completed for all the sets (S225=YES), collation unit 126 judges the terminal ID acquired from the terminal to not be the terminal ID of an invalidated terminal (step S226), and ends the TRL collation processing.

The following describes the concrete operations of content key distribution device 120 with reference to FIGS. 7 and 11, given that the content of the TRL stored in TRL storage unit 121 is as shown in FIG. 9, and assuming that a transmission signal which includes a terminal ID "1101" has been sent to content key distribution device 120 from terminal 13.

Transmission request reception unit 125 in content key distribution device 120 acquires and conveys to collation unit 126 a terminal ID "1101" sent from terminal 13 (step S41), collation unit 126 judges whether terminal ID "1101" sent from terminal 13 is included in discrete information in the TRL (step S221), and since the only ID in the discrete information is "0001", collation unit 126 ANDs terminal ID "1101" and mask data "1100" in the group information (step S223).

The AND computed in step S223 is "1100", and collation unit 126 judges whether the derived bit string "1100" and ID "1100" match (step S224), and since there is a match, collation unit 126 judges the terminal ID acquired from the terminal to be the terminal ID of an invalidated terminal (step S222), and as a result (step S43), conveys to encrypted content key transmitting unit 128 that an error message should be transmitted, and having received this instruction, encrypted content key transmitting unit 128 transmits an error message to terminal 13 (step S47).

Next, a description will be given of the concrete operations of content key distribution device 120, based on the same premise as above, and assuming that a transmission signal which includes a terminal ID "0010" has been sent to content key distribution device 120 from terminal 2.

Transmission request reception unit 125 in content key distribution device 120 acquires and conveys to collation unit 126 a terminal ID "0010" sent from terminal 2 (step S41), collation unit 126 judges whether terminal ID "0010" sent from terminal 2 is included in discrete information in the TRL (step S221), and since the only ID in the discrete information is "0001", collation unit 126 ANDs terminal ID "0010" and mask data "1100" in the group information (step S223).

The AND computed in step S223 is "0000", and collation unit 126 judges whether the derived bit string "0000" and ID "1100" match (step S224), and since there is not a match, collation unit 126 ANDs terminal ID "0010" and mask data "1110" in the group information (steps S225, S223).

The AND thus computed is "0010", and collation unit 126 judges whether the derived bit string "0010" and ID "0110" match (step S224), and since there is not a match and there are no more pieces of unprocessed mask data in the group information (step S225), collation unit 126 judges terminal ID "0010" acquired from the terminal to not be the terminal ID of an invalidated terminal (steps S226, S43), and conveys terminal ID "0010" to encryption unit 127.

On receipt of terminal ID "0010", encryption unit 127 encrypts a content key stored in content key storage unit 123, by extracting and using an encryption key $EK_2$ corresponding to "0010" from encryption key storage unit 124 (step S45), and conveys the encrypted content key obtained as a result to encrypted content key transmitting unit 128.

When the encrypted content key is conveyed, encrypted content key transmitting unit 128 transmits the encrypted content key to terminal 2 (step S46). Consequently, terminal 2, having acquired the encrypted content key, decrypts the encrypted content key using a decryption key $DK_2$ stored internally, and thus obtains a content key.

Embodiment 2

The following description relates to a content key distribution system according to an embodiment 2.

The content key distribution system according to embodiment 2 includes basically the same system structure as content key distribution system 100 shown in embodiment 1, and conducts basically the same system operations. Consequently, the various devices are shown using the same reference numbering as in FIG. 1 and the like, and a description of parts that are the same as embodiment 1 have been omitted.

In embodiment 2, however, a data structure of terminal IDs is special, and a data structure of a TRL differs from that of embodiment 1. For this reason, management device 110 conducts TRL data generation processing that differs from the TRL data generation processing shown in embodiment 1, and content key distribution device 120 conducts TRL collation processing that differs from the TRL collation processing shown in embodiment 1.

Terminal IDs

FIG. 12 shows the data structure of a terminal ID in embodiment 2.

In FIG. 12 is shown an exemplary structure in which a terminal ID is set to be 128 bits, so that it can be corresponded to hundreds of millions of terminal or more in a content key distribution system.

The terminal ID is constituted by a 32-bit manufacturer ID field 301, a 32-bit product ID field 302, a 32-bit product version ID field 303, and a 32-bit serial number field 304.

Here, in manufacturer ID field 301 is stored a manufacturer ID that is for identifying a manufacturer that made a content playback device.

In product ID field 302 is stored a product ID that is for identifying products of the manufacturer determined by the manufacturer ID.

In product version ID field 303 is stored a product version ID that shows a version number which is updated whenever there is a form change or the like in relation to a product determined by a product ID.

In serial number field 304 is stored a serial number consigned to discrete products.

TRL Structure

FIG. 13 shows a data structure of a TRL in embodiment 2.

In FIG. 13 is shown an exemplary data structure of a TRL corresponding to when the number of terminals is in the hundreds of millions or more.

As shown in FIG. 13, the TRL is structured from 8-bit version information 310, 128-bit issuer information 320, a 128-bit invalidated terminal number 330, ID-related information 340, and 320-bit signature information 350.

Version information 310 is information showing a version number of the TRL, and the version number is changed every time, for example, a TRL having different content is newly generated.

Issuer information 320 is information showing an issuance origin of a TRL.

Invalidated terminal number 330 is the number of invalidated terminals.

ID-related information 340 includes one or a plurality of sets of 128-bit IDs 342 and 8-bit mask bits 343, and an entry number 341 showing the number of sets. If the number of sets is given as N, a value shown by entry number 341 will be N.

Here, mask bit 343 takes a value from 1 to 128. Also, if the value of mask bit 343 is given as X, it is possible to derive mask data having a form that shows the high order X bits in a 128-bit bit string to be "1" and any remaining low order bits to all be "0".

Furthermore, ID 342 forming a set with mask bit 343 is data in which only a content of the number of bit digits, from an MSB in the 128-bit bit string structuring the ID, whose value is shown by mask bit 343, are useful, and in which other values are, for example, "0".

All of the terminal IDs whose high order X bits, expressed by value X of mask bit 343, match a value of ID 342 (i.e. the terminal IDs of $2^{128-x}$ number of invalidated terminals) are shown by the set of ID 342 and mask bit 343.

Signature information 350 is a so-called digital signature created to reflect an entirety of version information 310, issuer information 320, invalidated terminal number 330, and ID-related information 340.

TRL Data Generation Processing

Figure 14:
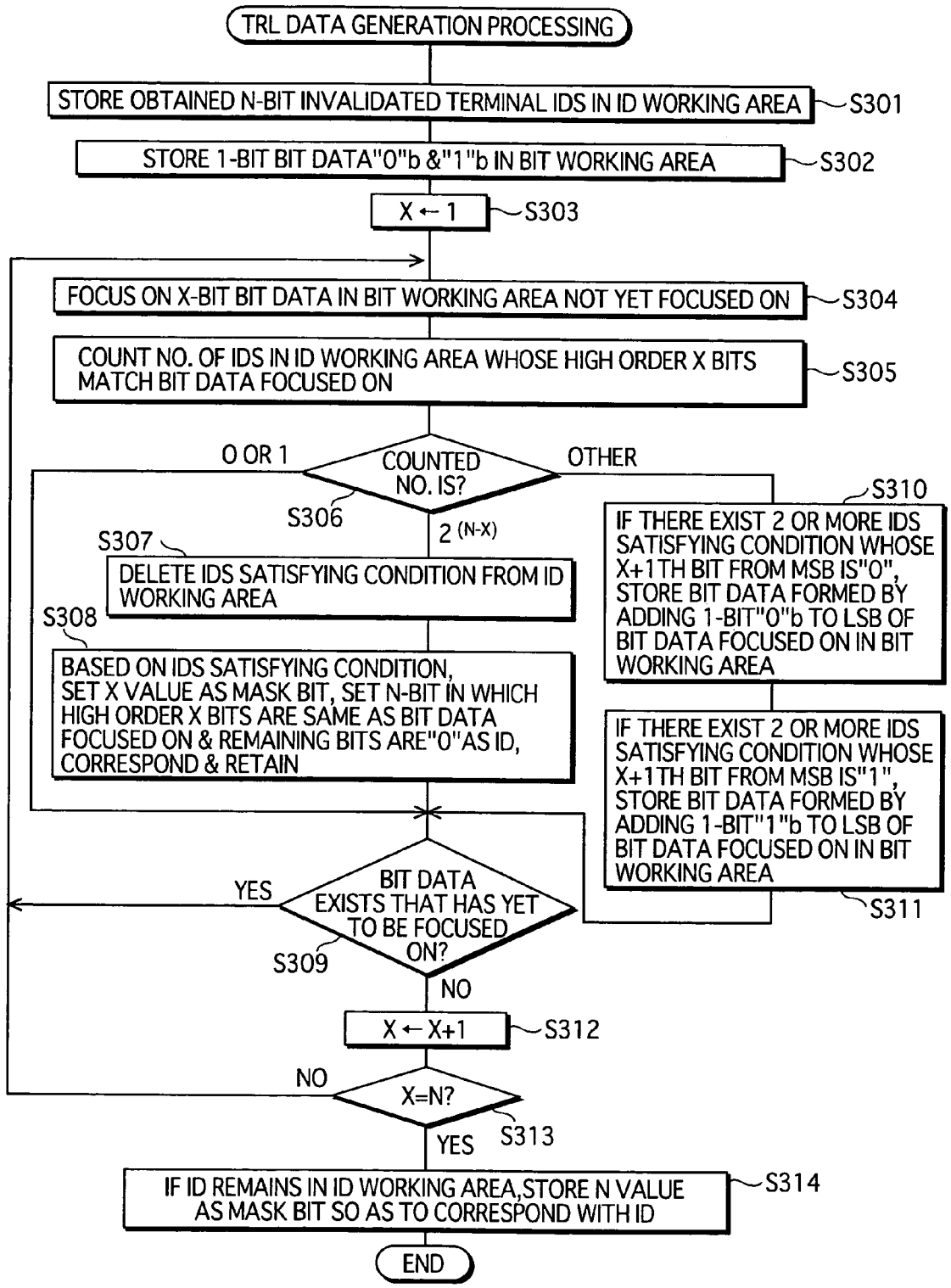
FIG. 14 is a flowchart showing TRL data generation processing, which is a part of TRL generation/transmission processing conducted by management device 110 in embodiment 2.

FIG. 14 is a flowchart showing TRL data generation processing, which is a part of the TRL generation/transmission processing conducted by management device 110 in embodiment 2.

A terminal ID is described here as being an N-bit. N is, for example, 128 bits.

TRL generation unit 112 in management device 110 conducts TRL data generation processing after acquiring terminal IDs related to invalidated terminals from invalidated-terminal ID acquisition unit 111 (see FIG. 5).

First, TRL generation unit 112 stores the acquired terminal IDs in a ID working area which is an area on a storage medium such as a memory or the like (step S301), stores two pieces of 1-bit bit data "0" and "1" in a bit working area which is an area on a storage medium such as a memory or the like (step S302), and sets "1" in variable X (step S303).

Next, TRL generation unit 112 focuses on a piece of X-bit bit data in the bit working area that has not been focused on (step S304), and counts the number of terminal IDs stored in the ID working area that satisfy a condition that the high order X bits match the bit data currently being focused on (step S305).

When the counted number in step S305 is $2^{(N-X)}$ (step S306), TRL generation unit 112 deletes the terminal IDs satisfying the condition in step S305 (step S307), and with respect to the terminal IDs satisfying the condition, determines the value of variable X as a mask bit, and determines an N-bit bit string having the high order X bits set to be the same as the bit data currently being focused on and the remaining bits set to "0" as an ID, retains the determined mask bit and ID as a set in an area of a storage medium such as a memory or the like (step S308), and conducts the step S309 judgment.

When the counted number in step S305 is 0 or 1 (step S306), TRL generation unit 112 skips steps S307 and S308, and conducts the step S309 judgment.

In the case that the counted number in step S305 is not any of $2^{(N-X)}$, 0 or 1 (step S306), if two or more of the terminal IDs satisfying the condition in step S305 have an X+1$^{th}$ bit from the MSB that is "0", TRL generation unit 112 stores, in the bit working area, bit data formed by adding a 1-bit "0" to the low order of the bit data being focused on (step S310), and if two or more of the terminal ID satisfying the condition have an X+1$^{th}$ bit from the MSB that is "1", TRL generation unit 112 stores, in the bit working area, bit data formed by adding a 1-bit "1" to the low order of the bit data being focused on (step S311), and conducts the step S309 judgment.

In step S309, TRL generation unit 112 judges whether there exists a piece of X-bit bit data that has yet to be focused on, and when there exists a piece of X-bit bit data yet to be focused on (S309=YES), TRL generation unit 112 returns to step S304, and conducts processing to focus on the next piece of bit data, and when there does not exist a piece of X-bit bit data yet to be focused on (S309=NO), TRL generation unit 112 increases variable X by "1" (step S312), and judges whether variable X equals N (step S313).

When variable X does not equal N (S313=NO), TRL generation unit 112 returns to step S304, and conducts processing to focus on the next piece of bit data, and when variable X equals N (S313=YES), and if there remain terminal IDs in the ID working area, TRL generation unit 112, with respect to the remaining terminal IDs, stores sets in which N is a mask bit and a remaining terminal ID is an ID, in an area of a storage medium such as a memory or the like (step S314), thus ending the TRL data generation processing.

Here, in embodiment 2, the TRL construction shown in step S23 of FIG. 5 is executed by adding, in addition to a version, issuer information, an invalidated-terminal number and signature information, an entry number to the one or plurality of sets of mask bits and IDs retained in an area of a storage medium as a result of the above TRL data generation processing.

FIG. 15 shows exemplary content of a TRL.

In FIG. 15 is shown exemplary content of a TRL which has the data items shown in FIG. 13, and in which terminal IDs are 4-bit bit strings, and mask bits are 2-bit data expressing "1" to "b 4"

The terminal IDs of all invalidated terminals expressed by the ID-related information shown as an example in FIG. 15 are the same as the terminal IDs of all invalidated terminals expressed by the ID-related information shown as an example in FIG. 9.

TRL Collation Processing

Figure 16:
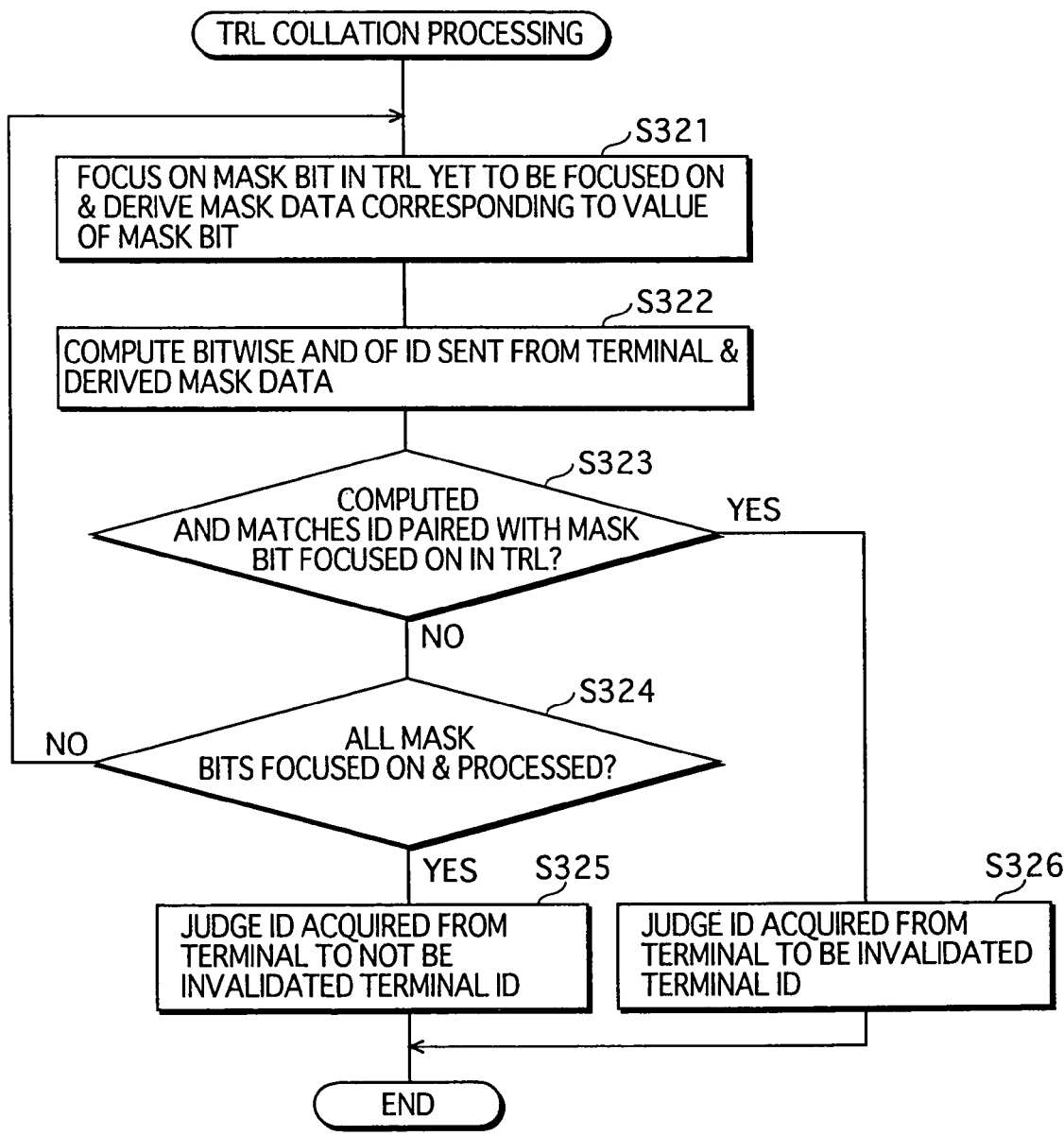
FIG. 16 is a flowchart showing TRL collation processing, which is a part of content key transmission processing conducted by content key distribution device 120 in embodiment 2.

FIG. 16 is a flowchart showing TRL collation processing, which is a part of the content key transmission processing conducted by content key distribution device 120 in embodiment 2.

Collation unit 126 in content key distribution device 120 conducts TRL collation processing every time a terminal ID sent from a terminal is obtained by transmission request reception unit 125.

Collation unit 126 checks whether a terminal ID sent from a terminal matches a terminal ID shown by one of the sets of IDs and mask bits in ID-related information in the TRL (steps S321-324).

More specifically, collation unit 126 focuses on a mask bit in the TRL that has yet to be focused on, derives mask data corresponding to a value of the mask bit as described above (step S321), computes a bitwise AND of the terminal ID sent from the terminal and the derived mask data (step S322), judges whether the computed AND matches an ID 342 in a set with the mask bit 343 being focused on (step S323), and if matched, judges the terminal ID acquired from the terminal to be the terminal ID of an invalidated terminal (step S326), and ends the collation processing.

If not matched in step S323 (S323=NO), collation unit 126 judges whether all of the mask bits 343 in the TRL have been focused on and had the step S321 to S323 processing conducted (step S324), and if all of the mask bits 343 have not been focused on and had the step S321 to S323 processing conducted (S324=NO), collation unit 126 returns to step S321, focuses on a mask bit that has yet to be focused on and conducts processing.

If judged in step S324 that the processing has been completed for all the mask bits (S324=YES), collation unit 126 judges the terminal ID acquired from the terminal to not be the terminal ID of an invalidated terminal (step S325), and ends the TRL collation processing.

Observations

In the content key distribution system shown in embodiment 2, terminal IDs have a data structure such as that shown in FIG. 12, and thus when all content playback devices having a specific version of a product made by a certain manufacturer mounted therein, it is possible for a management device to generate a TRL that specifies, using a small data volume, all content playback devices in which only the serial number field of the terminal IDs held within the device differ, and to transmit the generated TRL to a content key distribution device.

This TRL would include as ID-related information, only a set of (i) mask bit 343 whose value is, for example, set to "96" and (ii) ID 342 that is a bit string specifying a manufacturer, a product and a version, and in which the serial number is set to "0".

Embodiment 3

The following description relates to a content key distribution system according to an embodiment 3.

The content key distribution system according to an embodiment 3 includes basically the same system structure as content key distribution system 100 shown in embodiment 1, and conducts basically the same system operations. Consequently, the various devices are shown using the same reference numbering as in FIG. 1 and the like, and a description of parts that are the same as embodiment 1 have been omitted.

In embodiment 3, a data structure of terminal IDs is the same structure as that shown in embodiment 2. Also, a data structure of a TRL is different to that shown in embodiment 1, and adds a few extra data items to the TRL in embodiment 2. For this reason, management device 110 conducts TRL data generation processing that differs slightly from the TRL data generation processing shown in embodiment 2, and content key distribution device 120 conducts TRL collation processing that differs slightly from the TRL collation processing shown in embodiment 2.

TRL Structure

FIG. 17 shows a data structure of a TRL in embodiment 3.

In FIG. 17 is shown an exemplary data structure of a TRL corresponding to when the number of terminals is in the hundreds of millions or more.

As shown in FIG. 17, the TRL is structured from 8-bit version information 410, 128-bit issuer information 420, a 128-bit invalidated terminal number 430, ID-related information 440, and 320-bit signature information 450.

Version information 410, issuer information 420 and invalidated terminal number 430 are the same as version information 310, issuer information 320 and invalidated terminal number 330 shown in embodiment 2.

ID-related information 440 is the same as ID-related information 340 shown in embodiment 2 to the extent that it includes one or a plurality of sets of 128-bit IDs 342 and 8-bit mask bits 343, and an entry number 441 showing the number of sets. However, ID-related information 440 further includes one or a plurality of 128-bit exception IDs 445 and an exception entry number 444 showing the number of exception IDs. If the number of exception IDs is given as M, a value shown by exception entry number 444 will be M.

Here, an exception ID 445 is the terminal ID of a terminal that is not invalidated.

In ID-related information 440, the terminal IDs of a plurality of terminal are expressed generically by a set of ID 442 and mask bit 443, and terminal IDs expressed by the set that are not invalidated-terminal IDs are shown by an exception ID 445.

Consider an example in which each terminal ID is 4 bits, the terminals number 0 to 15, and all of terminals 8 to 15 except for terminal 10 are invalidated. A content of ID-related information 440 in this case will be formed by a set of an ID 442 "1000" and a mask bit 443 of value "1", and an exception ID 445 "1010".

Signature information 450 is a so-called digital signature created to reflect an entirety of version information 410, issuer information 420, invalidated terminal number 430, and ID-related information 440.

TRL Data Generation Processing

Figure 18:
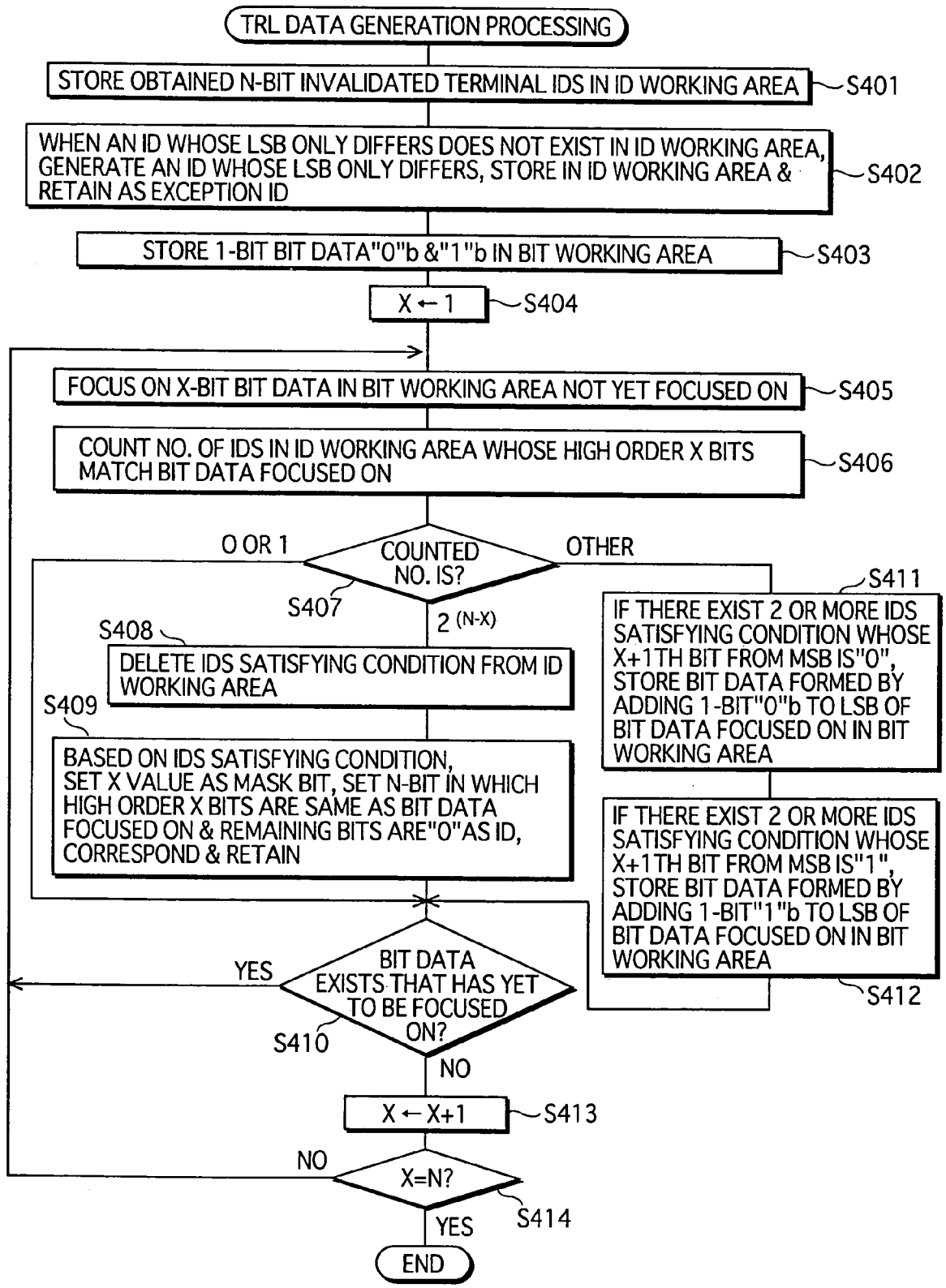
FIG. 18 is a flowchart showing TRL data generation processing, which is a part of TRL generation/transmission processing conducted by management device 110 in embodiment 3.

FIG. 18 is a flowchart showing TRL data generation processing, which is a part of the TRL generation/transmission processing conducted by management device 110 in embodiment 3.

A terminal ID is described here as being an N-bit. N is, for example, 128 bits.

TRL generation unit 112 in management device 110 conducts TRL data generation processing after acquiring terminal IDs related to invalidated terminals from invalidated-terminal ID acquisition unit 111 (see FIG. 5).

First, TRL generation unit 112 stores the acquired terminal IDs in a ID working area which is an area on a storage medium such as a memory or the like (step S401), and with respect to a terminal ID, among the terminal IDs in the ID working area, for which there does not exist a terminal ID whose LSB only differs, TRL generation unit 112 generates and stores the terminal ID whose LSB only differs in the ID working area, and retains the generated terminal ID as an exception ID (step S402).

TRL generation unit 112 then stores two pieces of 1-bit bit data "0" and "1" in a bit working area which is an area on a storage medium such as a memory or the like (step S403), and sets "1" in variable X (step S404).

Following step S404, TRL generation unit 112 focuses on a piece of X-bit bit data in the bit working area that has not been focused on (step S405), and counts the number of terminal IDs stored in the ID working area that satisfy a condition that the high order X bits match the bit data currently being focused on (step S406).

When the counted number in step S406 is $2^{(N-X)}$ (step S407), TRL generation unit 112 deletes the terminal IDs satisfying the condition in step S406 (step S408), and with respect to the terminal IDs satisfying the condition, determines the value of variable X as a mask bit, and determines an N-bit bit string having the high order X bits set to be the same as the bit data currently being focused on and the remaining bits set to "0" as an ID, retains the determined mask bit and ID as a set in an area of a storage medium such as a memory or the like (step S409), and conducts the step S410 judgment.

In the case that the counted number in step S406 is not $2^{(N-X)}$ (step S407), if two or more of the terminal IDs satisfying the condition in step S406 have an $X+1^{th}$ bit from the MSB that is "0", TRL generation unit 112 stores, in the bit working area, bit data formed by adding a 1-bit "0" to the low order of the bit data being focused on (step S411), and if two or more of the terminal ID satisfying the condition have an $X+1^{th}$ bit from the MSB that is "1", TRL generation unit 112 stores, in the bit working area, bit data formed by adding a 1-bit "1" to the low order of the bit data being focused on (step S412), and conducts the step S410 judgment.

In step S410, TRL generation unit 112 judges whether there exists a piece of X-bit bit data that has yet to be focused on, and when there exists a piece of X-bit bit data yet to be focused on (S410=YES), TRL generation unit 112 returns to step S405, and conducts processing to focus on the next piece of bit data, and when there does not exist a piece of X-bit bit data yet to be focused on (S410=NO), increases variable X by "1" (step S413), and judges whether variable X equals N (step S414).

When variable X does not equal N (S414=NO), TRL generation unit 112 returns to step S405, and conducts processing to focus on the next piece of bit data, and when variable X equals N (S414=YES), TRL generation unit 112 ends the TRL data generation processing.

Here, in embodiment 3, the TRL construction shown in step S23 of FIG. 5 is executed by adding, in addition to a version, issuer information, an invalidated-terminal number and signature information, an entry number to the one or plurality of sets of mask bits and IDs retained in an area of a storage medium as a result of the above TRL data generation processing, and an entry number to the exception ID.

TRL Collation Processing

Figure 19:
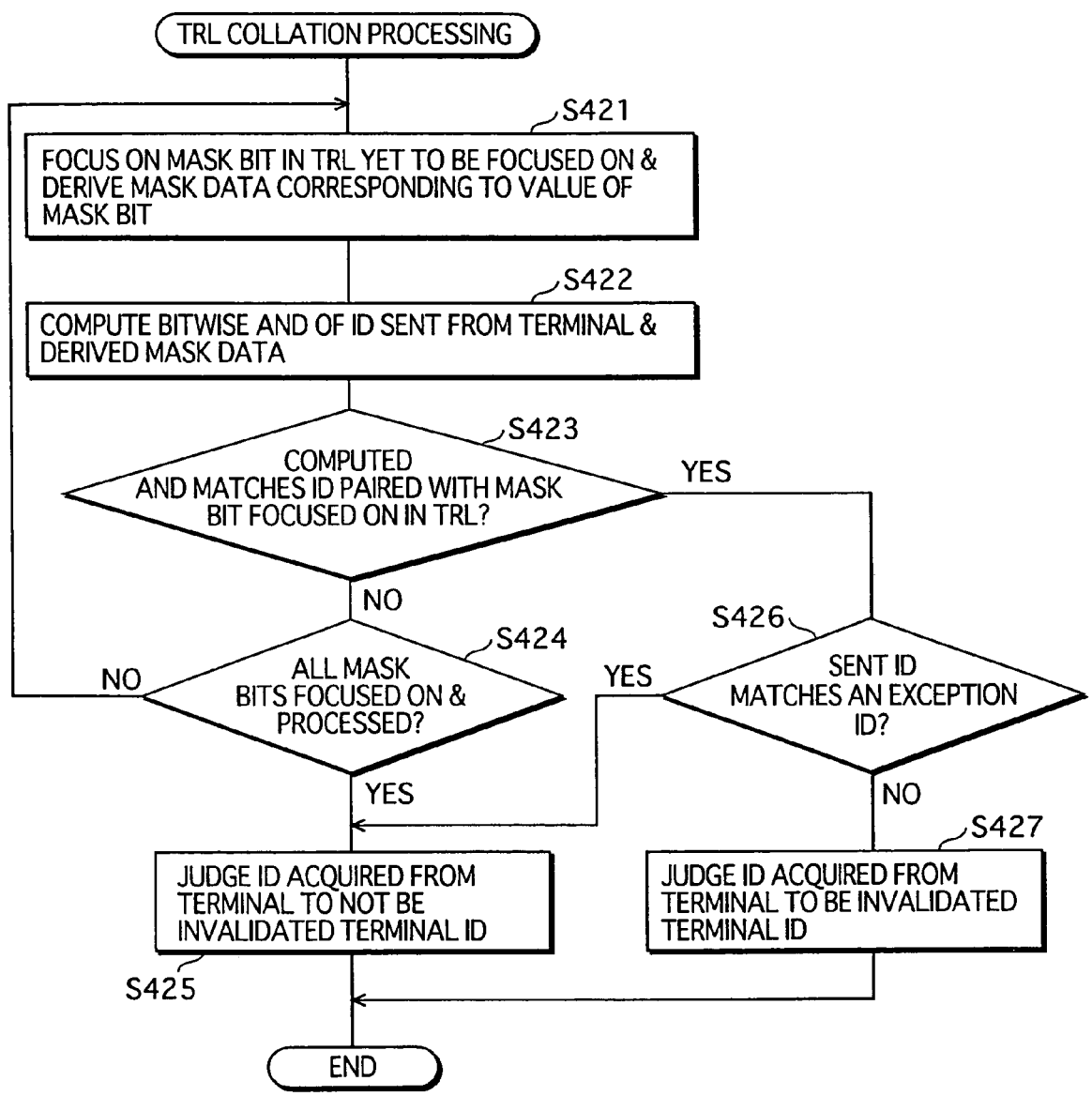
FIG. 19 is a flowchart showing TRL collation processing, which is a part of content key transmission processing conducted by content key distribution device 120 in embodiment 3.

FIG. 19 is a flowchart showing TRL collation processing, which is a part of the content key transmission processing conducted by content key distribution device 120 in embodiment 3.

Collation unit 126 in content key distribution device 120 conducts TRL collation processing every time a terminal ID sent from a terminal is obtained by transmission request reception unit 125.

Collation unit 126 checks whether a terminal ID sent from a terminal matches a terminal ID shown by one of the sets of IDs and mask bits in ID-related information in the TRL (steps S421-424).

More specifically, collation unit 126 focuses on a mask bit in the TRL that has yet to be focused on, derives mask data corresponding to a value of the mask bit as described above (step S421), computes a bitwise AND of the terminal ID sent from the terminal and the derived mask data (step S422), and judges whether the computed AND matches an ID 342 in a set with the mask bit 343 being focused on (step S423).

If judged in step S423 to be a matched (S423=YES), collation unit 126 checks whether the terminal ID sent from the terminal matches an exception ID in the TRL (step S426), and if not matched (S426=NO), judges the terminal ID acquired from the terminal to be the terminal ID of an invalidated terminal (step S427), and ends the collation processing. If judged in step S426 to be a matched (S426=YES), collation unit 126, judges the terminal ID acquired from the terminal to not be the terminal ID of an invalidated terminal (step S425), and ends the collation processing.

If judged in step S423 that the computed AND does not match the ID 342 in the set with the mask bit 343 being focused on (S423=NO), collation unit 126 judges whether all of the mask bits 343 in the TRL have been focused on and had the step S421 to S423 processing conducted (step S424), and if all of the mask bits 343 have not been focused on and had the step S421 to S423 processing conducted (S424=NO), collation unit 126 returns to step S421, focuses on a mask bit that has yet to be focused on and conducts processing.

If judged in step S424 that the processing has been completed for all the mask bits (S424=YES), collation unit 126 judges the terminal ID acquired from the terminal to not be the terminal ID of an invalidated terminal (step S425), and ends the TRL collation processing.

Observations

According to the content key distribution system shown in embodiment 3, if, for example, a couple of dozen terminals having consecutive serial numbers and whose terminal IDs have bit strings in which a number of high order digits are the same, are all invalidated terminals except for a few, it is possible to specify invalidated terminals using a TRL in which the IDs that include bit strings having the same value digits are determined as IDs in the ID-related information of the TRL, a value showing the number of digits of the sections that are the same is determined as a mask bit forming a set with the ID, and terminal IDs relating to the few terminals that are not invalidated are determined as exception IDs in the ID-related information. As a result, it is possible to suppress to data volume of a TRL.

Embodiment 4

The following describes a content distribution system according to an embodiment 4.

Figure 20:
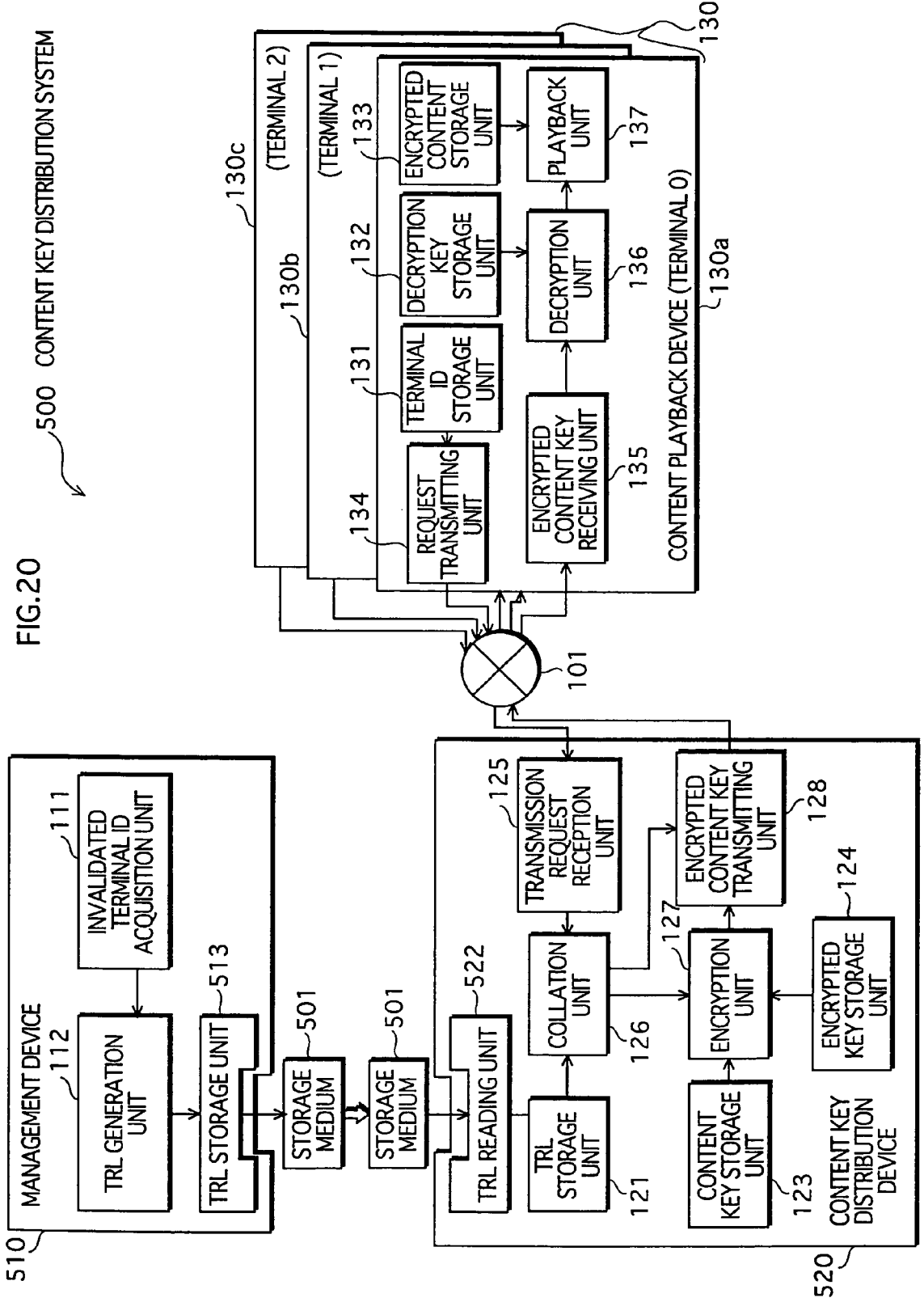
FIG. 20 is a structural diagram of a content key distribution system according to an embodiment 4 of the present invention.

FIG. 20 is a structural diagram of a content key distribution system according to embodiment 4 of the present invention.

In comparison with management device 110 in content key distribution system 100 shown in embodiment 1, which was for transmitting a TRL to content key distribution device 120 via a communication channel, in content key distribution system 500 according to embodiment 4, a management device 510 is structured to store a TRL on a storage medium 501 such as an optical magnetic disk or the like, and a content key distribution device 520 is structured to read the TRL from storage medium 501.

In FIG. 20, elements that are basically the same as those in embodiment 1 (see FIG. 1) are shown using the same reference numbering, and a detailed description of these elements is omitted here.

Management device 510 is, for example, a computer or the like installed in an organization that conducts operations relating to the protection of the copyright and the like of content, and conducts processing to generate a TRL that has as main content, information for specifying all terminals with respect to which protection of copyright and the like can no longer be guaranteed due to a decryption key stored therein having been disclosed (i.e. all terminals to which an encrypted content key should not be distributed), and for storing the generated TRL on a storage medium. Management device 510 includes invalidated-terminal ID acquisition unit 111, TRL generation unit 112, and a TRL storage unit 513, and is capable of mounting storage medium 501, which is an optical magnetic disk or the like.

Here, TRL generation unit 112 functions to generate a TRL whose main content is information specifying invalidated terminals, based on the terminal IDs provided by invalidated-terminal ID acquisition unit 111, and to convey the generated TRL to TRL storage unit 513.

TRL storage unit 513 functions to store a TRL conveyed from TRL generation unit 112 on storage medium 501 mounted in management device 510.

Management device 510 conducts TRL generation/transmission processing in which step S24 shown in FIG. 5 is replaced by processing to record a TRL on a storage medium.

Storage medium 501 having a TRL stored therein by management device 510 is delivered to content key distribution device 520. For example, every time a TRL having new content is generated, the TRL may be stored on a storage medium, and delivered to a content key distribution device.

Content key distribution device 520 is a computer for conducting content key distribution processing that involves transmitting an encrypted content key to terminals from which a transmission request for a content key has been received, so long as the terminal is not an invalidated terminal.

Functionally, content key distribution device 520 includes TRL storage unit 121, a TRL reading unit 522, content key storage unit 123, encryption key storage unit 124, transmission request reception unit 125, collation unit 126, encryption unit 127, and encrypted content key transmitting unit 128, and is capable of mounting storage medium 501 (eg. optical magnetic disk, etc.).

Here, TRL reading unit 522 functions to read a TRL from storage medium 501 mounted in content key distribution device 520, and to store the read TRL in TRL storage unit 121.

Consequently, in content key distribution system 500, management device 510 and content key distribution device 520 can realize transfer, even when not connected by a communication channel.

A TRL employed in embodiment 4 may be a TRL as shown in any of embodiments 1 to 3, and the content key distribution device may be structured to conduct TRL collation processing and the like as required by the structure of the TRL.

Supplementary Matters

An encryption communications system according to the present invention is described above in embodiments 1 to 4 when applied as a content key distribution system. The present invention is, however, not limited to embodiments such as these. More specifically:

(1) In embodiments 1 to 3, a communication channel is shown for distributing a TRL between a management device and a content key distribution device, and in embodiment 4, a storage medium is shown for use in delivering a TRL. However, a TRL may be transferred between a management device and a content key distribution device using a combination of a communication channel and a storage medium. For example, a TRL may be delivered on a storage medium from a management device to a separate communications device, and the TRL may be distributed from the communications device to a content key distribution device via a communication channel.

(2) A content playback device shown in the above embodiments is not necessarily required to send a transmission request to a content key distribution device after acquiring encrypted content, and may, for example, acquire and conduct playback of encrypted content after acquiring a content key.

(3) Each content playback device shown in the above embodiments is structure to hold a decryption key unique to the content playback device, and a content key distribution device is structured to hold encryption keys that correlate one-to-one with the decryption keys. However, a content playback device may be structured to have a plurality of decryption keys, and to include, in the transmission request sent to a content key distribution device, a decryption key ID for identifying a decryption key. Furthermore, the content key distribution device may hold, in correspondence with the decryption key IDs, encryption keys correlating with all of the decryption keys, and may transmit a content key to the content playback device using an encryption key corresponding to the sent decryption key ID. In this case, it is preferable to structure the system such that, instead of terminal IDs of invalidated terminals, decryption key IDs corresponding to decryption keys to be invalidated are specify by ID-related information in a TRL such as shown in the embodiments, and that in the TRL processing and the like, decryption keys are targeted for collation rather than terminal IDs.

Furthermore, decryption keys and decryption key IDs may be stored on an IC card or the like that is mountable in a content playback device.

(4) In embodiment 1 to 3, TRL generation unit 112 in the management device automatically generates a TRL by TRL data generation processing (FIGS. 10, 14, 18) and the like. However, an algorithm for generating the ID-related information in a TRL is not limited to this. Furthermore, a TRL may be generated by receiving an input operation from an operator or the like, or a TRL generated in an external device may be distributed by TRL transmitting unit 113 after being acquired from within the management device.

Furthermore, a plurality of management devices may exist in a content key distribution system, and a TRL may be sent from one management device to another management device. Furthermore, a management device may conduct the transmission of a TRL when a request is sent to the management device from a content key distribution device, and a content key distribution device may request a management device to sent a TRL periodically or when there is a transmission request from a terminal.

(5) A content of the data structure of terminal IDs shown in embodiment 2 does not necessarily have to be as shown in FIG. 12. However, it is possible to reduce the data volume of a TRL when, for example, all of the terminals from a particular manufacturer are invalidated terminals, by having bit strings expressing a manufacturer, product and the like included in terminal IDs.

Furthermore, in embodiment 2, an example is given which defines terminal IDs as expressing manufacturer IDs by high order bit strings. However, terminal IDs may be defined as expressing manufacturer IDs by low order bit strings in a terminal ID, or as expressing manufacturer IDs by intermediate bit strings between high and low order bit strings.

(6) Although a mask bit in ID-related information in a TRL shown in embodiment 2 is, for example, fixed-length data of 8 bits or the like, the mask bit may be variable-length data and paired with information showing the data length.

(7) In relation to ID-related information obtained as a result of the TRL data generation processing shown in embodiment 3, when a terminal ID is 128 bits, and the ID-related information includes an exception ID and a set having an ID whose LSB is "0" and a mask bit of "127", the set and the exception ID may be deleted, and a set added to the ID-related information that has mask bit of "128" and a bit string obtained by inverting the LSB of the exception ID as an ID.

Furthermore, in embodiment 3, each exception ID is described as showing a single terminal ID, although instead of the exception ID shown in FIG. 17, exception group information that includes one or a plurality of sets of exception IDs and exception mask bits may be included in the ID-related information of a TRL. In other words, the ID-related information may be structured such that all terminal IDs except for the terminal IDs shown by the exception ID/exception mask bit sets are the terminal IDs of invalidated terminals.

(8) In embodiments 1 to 4, an example is given of an encryption communications system according to the present invention being applied in a content key distribution system. However, if the communications system is one that receives terminal IDs from terminals, judges whether or not those terminals are invalidated terminals, and determines whether or not to execute some sort of communication processing depending on the judgment result, then the communication processing content is not especially limited to transmitting encrypted content keys. For example, it is acceptable to determine, depending on the result of the judgment as to whether a terminal is invalidated, whether to execute processing for receiving important data sent from the terminal after being encrypted by performing an encryption unique to the terminal.

(9) A computer program for having a computer or the like execute the processing procedures of the content key distribution system shown in embodiments 1 to 3 (i.e. the procedures shown in FIGS. 5~7, 10, 11, 14, 16, 18, 19, etc.) can be distributed by being stored on a storage medium or be being circulated via any of a variety of communication channels or the like. The storage medium may be an IC card, an optical disk, a flexible disk, a ROM, or the like. A computer program distributed by circulation via a communication channel or the like may be submitted for use by being installed or the like in a computer or the like, and the computer or the like can conduct processing such as that shown in embodiments 1 to 3 by executing the computer program.

INDUSTRIAL APPLICABILITY

The encryption communications system of the present invention is applicable as, for example, a content key distribution system constituted by a plurality of terminals, computers, or the like, for providing the copyright protection of digital content.

The invention claimed is:

1. An encryption communications system comprising:
an encryption communications device;
a plurality of terminals that are each operable to transmit to the encryption communications device an identifier, which is a bit string having a predetermined number of bits and is held by the respective terminal; and
a management device that is operable to generate invalidation information showing one or more of the identifiers as information specifying one or more terminals to be invalidated, wherein
the management device includes:
an invalidation information generation unit operable to generate the invalidation information using a data format that generically expresses, by information specifying a value of a section in a bit string having the predetermined number of bits, all identifiers in which a value of the section matches the specified value; and
an output unit operable to output the generated invalidation information,
the encryption communications device includes:
an invalidation information acquisition unit operable to acquire the invalidation information outputted by the management device;
an identifier receiving unit operable, when an identifier is transmitted from one of the terminals, to receive the identifier;
a judging unit operable to judge whether the received identifier matches any of the one or more identifiers shown by the invalidation information as information specifying one or more terminals to be invalidated; and
a communication unit operable to (i) when judged to not be any matches, conduct a predetermined communication with the terminal that transmitted the identifier, and (ii) when judged to be a match, not conduct the predetermined communication with the terminal,
the invalidation information (i) includes one or more sets of value and position information, each piece of value information showing a value of a section of a bit string having the predetermined number of bits, and a corresponding piece of position information specifying a bit position of the section in the bit string, and (ii) is information specifying, as a terminal to be invalidated, all terminals holding an identifier in which a value of a partial bit string located in a bit position specified by a piece of position information matches a value shown by a piece of value information corresponding to the piece of position information, and the judging unit (i) verifies, for each piece of position information, whether a value, in the received identifier, of a partial bit string located in a bit position specified by the piece of position information matches a value shown by a piece of value information corresponding to the piece of position information, and (ii) judges, when verified that there is at least one match, that the received identifier matches an identifier shown by the invalidation information.

2. An encryption communications device for conducting communications with a plurality of terminals, each of which holds an identifier, which is a bit string having a predetermined number of bits, the encryption communications device comprising:

an invalidation information acquisition unit operable to acquire, from an external source, invalidation information that shows the one or more identifiers held by one or more terminals as information for specifying one or more terminals to be invalidated, the invalidation information being structured using a data format that generically expresses, by information specifying a value of a section in a bit string having the predetermined number of bits, all identifiers in which a value of the section matches the specified value;

an identifier receiving unit operable, when an identifier held by a terminal is transmitted from the terminal, to receive the identifier;

a judging unit operable to judge whether the received identifier matches any of the one or more identifiers shown by the invalidation information as information specifying one or more terminals to be invalidated; and a communication unit operable to (i) when judged to not be any matches, conduct a predetermined communication with the terminal that transmitted the identifier, and (ii) when judged to be a match, not conduct the predetermined communication with the terminal, wherein the invalidation information (i) includes one or more sets of value and position information, each piece of value information showing a value of a section of a bit string having the predetermined number of bits, and a corresponding piece of position information specifying a bit position of the section in the bit string, and (ii) is information specifying, as a terminal to be invalidated, all terminals holding an identifier in which a value of a partial bit string located in a bit position specified by a piece of position information matches a value shown by a piece of value information corresponding to the piece of position information, and the judging unit (i) verifies, for each piece of position information, whether a value, in the received identifier, of a partial bit string located in a bit position specified by the piece of position information matches a value shown by a piece of value information corresponding to the piece of position information, and (ii) judges, when verified that there is at least one match, that the received identifier matches an identifier shown by the invalidation information.

* * * * *